(12) United States Patent
Isomura et al.

(10) Patent No.: US 9,254,837 B2
(45) Date of Patent: Feb. 9, 2016

(54) DRIVING DEVICE FOR VEHICLE

(75) Inventors: Haruo Isomura, Susono (JP); Hiroaki Ebuchi, Hadano (JP); Hiroyuki Shibata, Odawara (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/390,576

(22) PCT Filed: Apr. 4, 2012

(86) PCT No.: PCT/JP2012/059253
§ 371 (c)(1),
(2), (4) Date: Oct. 3, 2014

(87) PCT Pub. No.: WO2013/150626
PCT Pub. Date: Oct. 10, 2013

(65) Prior Publication Data
US 2015/0119190 A1    Apr. 30, 2015

(51) Int. Cl.
*F16H 3/72* (2006.01)
*B60W 20/00* (2006.01)
*B60K 6/48* (2007.10)
*B60K 6/547* (2007.10)
*F16H 61/04* (2006.01)
*B60W 10/113* (2012.01)
*F16H 3/00* (2006.01)
*B60W 10/10* (2012.01)
(Continued)

(52) U.S. Cl.
CPC ............. *B60W 20/108* (2013.01); *B60K 6/48* (2013.01); *B60K 6/547* (2013.01); *B60W 10/06* (2013.01); *B60W 10/08* (2013.01); *B60W 10/10* (2013.01); *B60W 10/113* (2013.01); *B60W 20/00* (2013.01); *F16H 3/006* (2013.01); *F16H 61/04* (2013.01); *B60K 2006/4825* (2013.01); *F16H 2061/0425* (2013.01); *F16H 2061/0433* (2013.01); *F16H 2200/0052* (2013.01); *F16H 2200/2005* (2013.01); *F16H 2306/44* (2013.01); *Y02T 10/6221* (2013.01); *Y02T 10/6252* (2013.01); *Y10S 903/93* (2013.01); *Y10T 477/23* (2015.01)

(58) Field of Classification Search
None
See application file for complete search history.

(56) References Cited

U.S. PATENT DOCUMENTS 7,575,529 B2 *   8/2009   Holmes .............................. 475/5
7,628,720 B2 *  12/2009   Sakamoto et al. ................. 475/5
(Continued)

FOREIGN PATENT DOCUMENTS

JP   2005-014797 A   1/2005
JP   2007224965 A    9/2007
(Continued)

*Primary Examiner* — Dirk Wright
(74) *Attorney, Agent, or Firm* — Kenyon & Kenyon LLP

(57) ABSTRACT

A first shaft and a second shaft configured to connect the engine to the driving shaft and connectable/disconnectable to/from the engine, and a differential mechanism configured to connect the first shaft, the second shaft, and a rotating electrical machine to one another are provided, wherein, at the time of upshift to a gear shift stage of the second shaft from a state in which the engine is connected to the driving shaft through a gear shift stage of the first shaft, power transmission to the driving shaft through the second shaft is blocked, the second shaft is connected to the engine, power of the engine is transmitted to the second shaft by output control of the rotating electrical machine, the first shaft is disconnected from the engine, and the engine is connected to the driving shaft through the gear shift stage of the second shaft.

5 Claims, 30 Drawing Sheets

(51) Int. Cl.
*B60W 10/06* (2006.01)
*B60W 10/08* (2006.01)

(56) References Cited

U.S. PATENT DOCUMENTS

| | | | |
|---|---|---|---|
| 8,517,876 B2 * | 8/2013 | Sakai et al. | 475/5 |
| 8,579,751 B2 * | 11/2013 | Phillips | 475/5 |
| 2003/0019313 A1 | 1/2003 | Ibamoto et al. | |
| 2005/0072256 A1 | 4/2005 | Ibamoto et al. | |
| 2006/0258506 A1 | 11/2006 | Ibamoto et al. | |
| 2007/0197343 A1 | 8/2007 | Sakamoto et al. | |

FOREIGN PATENT DOCUMENTS

| | | |
|---|---|---|
| JP | 4199456 B2 | 10/2008 |
| JP | 2009-001120 A | 1/2009 |
| WO | 01/66971 A1 | 9/2001 |

\* cited by examiner

|  | GEAR RATIO |
|---|---|
| 1st | 3.5 |
| 2nd | 1.9 |
| 3rd | 1.2 |
| 4th | 0.9 |
| 5th | 0.7 |
| DIFFERENTIAL RATIO | 4.5 |

FIG.22

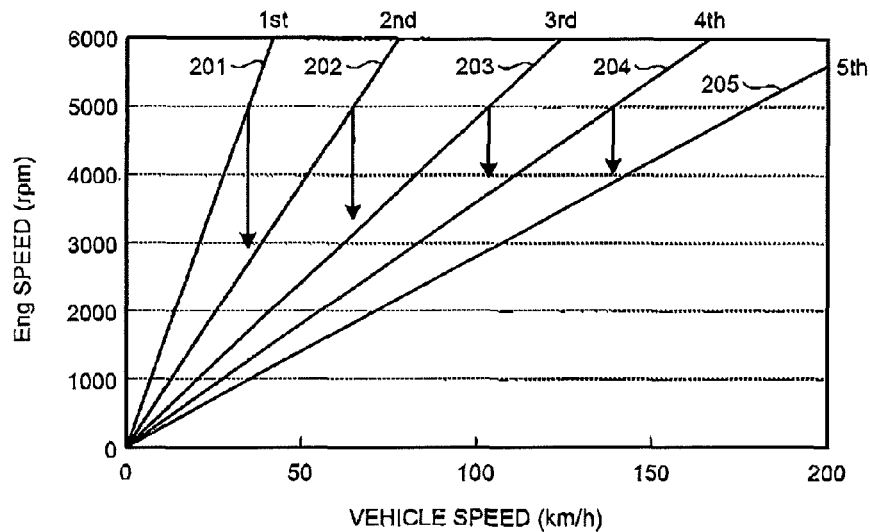

FIG.23

|  |  | 1st→2nd | 2nd→3rd | 3rd→4th | 4th→5th |
|---|---|---|---|---|---|
| 1) Eng SPEED BEFORE GEAR SHIFT (rpm) | Ne_X | 5000 | 5000 | 5000 | 5000 |
| 2) Eng SPEED AFTER GEAR SHIFT (rpm) | Ne_Y | 2714 | 3158 | 3750 | 3889 |
| 3) MG ROTATIONAL SPEED BEFORE GEAR SHIFT (rpm) | Ng_X | 1143 | 921 | 625 | 556 |
| 4) MG ROTATIONAL SPEED AFTER GEAR SHIFT (rpm) | Ng_Y | 0 | 0 | 0 | 0 |
| 5) Eng TORQUE BEFORE GEAR SHIFT (Nm) | Te_X | 230 | 230 | 230 | 230 |
| 6) Eng TORQUE WHEN Eng SPEED IS CHANGED (Nm) | Te_h | 219 | 228 | 238 | 239 |
| 7) Eng TORQUE AFTER GEAR SHIFT (Nm) | Te_Y | 219 | 228 | 238 | 239 |
| 8) MG TORQUE WHEN Eng SPEED IS CHANGED (Nm) | Tg_h | 439 | 456 | 475 | 478 |
| 9) MAXIMUM MG OUTPUT (kW) | Wg_max | 52.5 | 44.0 | 31.1 | 27.8 |

FIG.38

|  |  | 1st→2nd | 2nd→3rd | 3rd→4th | 4th→5th |
|---|---|---|---|---|---|
| 1) Eng SPEED BEFORE GEAR SHIFT (rpm) | Ne_x | 5000 | 5000 | 5000 | 5000 |
| 2) Eng SPEED AFTER GEAR SHIFT (rpm) | Ne_Y | 2714 | 3158 | 3750 | 3889 |
| 3) MG ROTATIONAL SPEED BEFORE GEAR SHIFT (rpm) | Ng_x | 0 | 0 | 0 | 0 |
| 4) MG ROTATIONAL SPEED AFTER GEAR SHIFT (rpm) | Ng_Y | 1143 | 921 | 625 | 556 |
| 5) Eng TORQUE BEFORE GEAR SHIFT (Nm) | Te_x | 230 | 230 | 230 | 230 |
| 6) Eng TORQUE WHEN Eng SPEED IS CHANGED (Nm) | Te_h | 119 | 144 | 178 | 186 |
| 7) Eng TORQUE AFTER GEAR SHIFT (Nm) | Te_Y | 219 | 228 | 238 | 239 |
| 8) MG TORQUE WHEN Eng SPEED IS CHANGED (Nm) | Tg_h | 238 | 288 | 356 | 372 |
| 9) MAXIMUM MG OUTPUT (kW) | Wg_max | 28.5 | 27.8 | 23.3 | 21.6 |

FIG.55

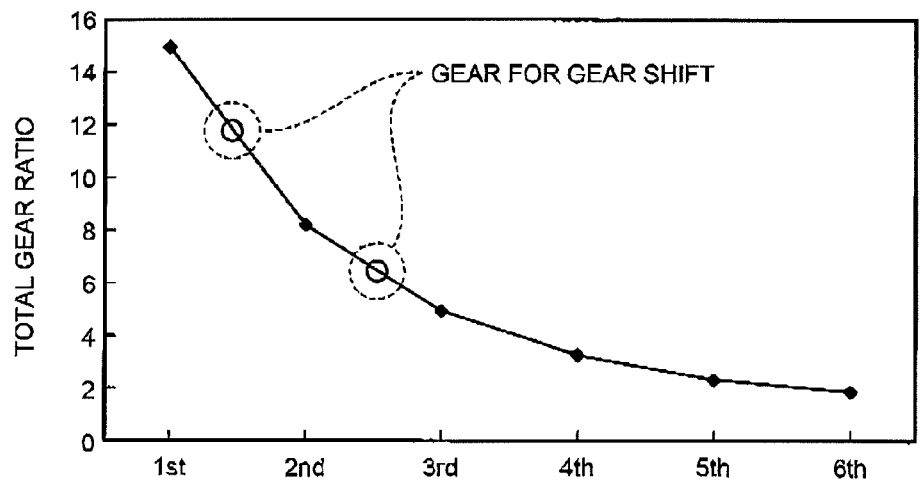

FIG.56

| | | 1st→2nd | 2nd→3rd | 3rd→4th | 4th→5th |
|---|---|---|---|---|---|
| 1) Eng SPEED BEFORE GEAR SHIFT (rpm) | $Ne\_x$ | 5000 | 5000 | 5000 | 5000 |
| 2) Eng SPEED AFTER GEAR SHIFT (rpm) | $Ne\_Y$ | 2714 | 3158 | 3750 | 3889 |
| 3) MG ROTATIONAL SPEED BEFORE GEAR SHIFT (rpm) | $Ng\_X$ | 571 | 461 | 313 | 278 |
| 4) MG ROTATIONAL SPEED AFTER GEAR SHIFT (rpm) | $Ng\_Y$ | -571 | -461 | -313 | -278 |
| 5) Eng TORQUE BEFORE GEAR SHIFT (Nm) | $Te\_x$ | 230 | 230 | 230 | 230 |
| 6) Eng TORQUE WHEN Eng SPEED IS CHANGED (Nm) | $Te\_h$ | 154 | 177 | 204 | 209 |
| 7) Eng TORQUE AFTER GEAR SHIFT (Nm) | $Te\_Y$ | 219 | 228 | 238 | 239 |
| 8) MG TORQUE WHEN Eng SPEED IS CHANGED (Nm) | $Tg\_h$ | 309 | 353 | 407 | 418 |
| 9) MAXIMUM MG OUTPUT (kW) | $Wg\_max$ | 18.5 | 17.0 | 13.3 | 12.2 |

DRIVING DEVICE FOR VEHICLE

CROSS-REFERENCE TO RELATED APPLICATIONS

This is a national phase application based on the PCT International Patent Application No. PCT/JP2012/059253 filed Apr. 4, 2012, the entire contents of which are incorporated herein by reference.

FIELD

The present invention relates to a driving device for vehicle.

BACKGROUND

A vehicle including a rotating electrical machine and a plurality of transmission mechanisms is conventionally well-known. For example, Patent Literature 1 discloses technology of a control device of a transmission including a first transmission gear train provided on a first input shaft, a second transmission gear train provided on a second input shaft, and a motor which relatively applies torque between the first and second input shafts. The control device of the transmission of Patent Literature 1 described above is configured to control torque and a rotational speed of the motor to shift an engine output to a next gear while the engine output is decreased and recover the engine output to an original value when the shift is finished in an active gear shift system.

CITATION LIST

Patent Literature

Patent Literature 1: Japanese Patent Application Laid-open No. 2005-14797

SUMMARY

Technical Problem

Herein, when a large output of the rotating electrical machine is required during gear shift, there is a problem that the rotating electrical machine becomes large. It is desired that the output of the rotating electrical machine during the gear shift may be decreased.

An object of the present invention is to provide the driving device for vehicle capable of decreasing the output of the rotating electrical machine during the gear shift.

Solution to Problem

A driving device for vehicle according to the present invention includes a first shaft configured to connect an engine to a driving shaft and capable of connecting/disconnecting to/from the engine; a second shaft configured to connect the engine to the driving shaft and capable of connecting/disconnecting to/from the engine; and a differential mechanism configured to connect the first shaft, the second shaft, and a rotating electrical machine to one another, wherein at the time of upshift to a gear shift stage of the second shaft from a state in which the first shaft is connected to the engine and the engine is connected to the driving shaft through a gear shift stage of the first shaft, power transmission to the driving shaft through the second shaft is blocked, the second shaft is connected to the engine, power of the engine is transmitted to the second shaft by output control of the rotating electrical machine, the first shaft is disconnected from the engine, and the engine is connected to the driving shaft through the gear shift stage of the second shaft.

In the driving device for vehicle, it is preferable that two successive gear shift stages arranged on any one of the first and second shafts and an intermediate gear shift stage arranged on the other shaft, wherein a transmission gear ratio of the intermediate gear shift stage is the transmission gear ratio between transmission gear ratios of the two successive gear shift stages, and the upshift between the two successive gear shift stages is through the intermediate gear shift stage.

In the driving device for vehicle, it is preferable that the intermediate gear shift stage is provided for a group of gear shift stages in which a gear step ratio of the two successive gear shift stages is not smaller than a predetermined value.

In the driving device for vehicle, it is preferable that at the time the upshift from the gear shift stage of the first shaft to the gear shift stage of the second shaft is predicted, the power transmission to the driving shaft through the second shaft is blocked in advance.

In the driving device for vehicle, it is preferable that the rotating electrical machine performs power running at the time of the upshift from the gear shift stage of the first shaft to the gear shift stage of the second shaft.

Advantageous Effects of Invention

A driving device for vehicle according to the present invention is provided with a first shaft which connects an engine to a driving shaft and connectable/disconnectable to/from the engine, a second shaft which connects the engine to the driving shaft and connectable/disconnectable to/from the engine, and a differential mechanism which connects the first shaft, the second shaft, and a rotating electrical machine to one another. At the time of upshift to a gear shift stage of the second shaft from a state in which the first shaft is connected to the engine and the engine is connected to the driving shaft through a gear shift stage of the first shaft, power transmission to the driving shaft through the second shaft is blocked, the second shaft is connected to the engine, power of the engine is transmitted to the second shaft by output control of the rotating electrical machine, the first shaft is disconnected from the engine, and the engine is connected to the driving shaft through the gear shift stage of the second shaft. The driving device for vehicle according to the present invention has an effect of decreasing an output of the rotating electrical machine during gear shift.

BRIEF DESCRIPTION OF DRAWINGS

FIG. 22 is a view of the relationship between the vehicle speed and the engine speed.

FIG. 23 is a view of a calculation result according to the first gear shift control.

FIG. 38 is a view of a calculation result according to the second gear shift control.

FIG. 55 is a view of a total gear ratio of a driving device for vehicle according to the variation of the embodiment.

FIG. 56 is a view of a calculation result according to gear shift using an intermediate gear shift stage.

DESCRIPTION OF EMBODIMENTS

A driving device for vehicle according to an embodiment of the present invention is hereinafter described in detail with reference to the drawings. Meanwhile, the present invention is not limited by the embodiment. Components in the following embodiment include a component easily conceived of by one skilled in the art or a substantially identical component.

Embodiment

Figure 1:
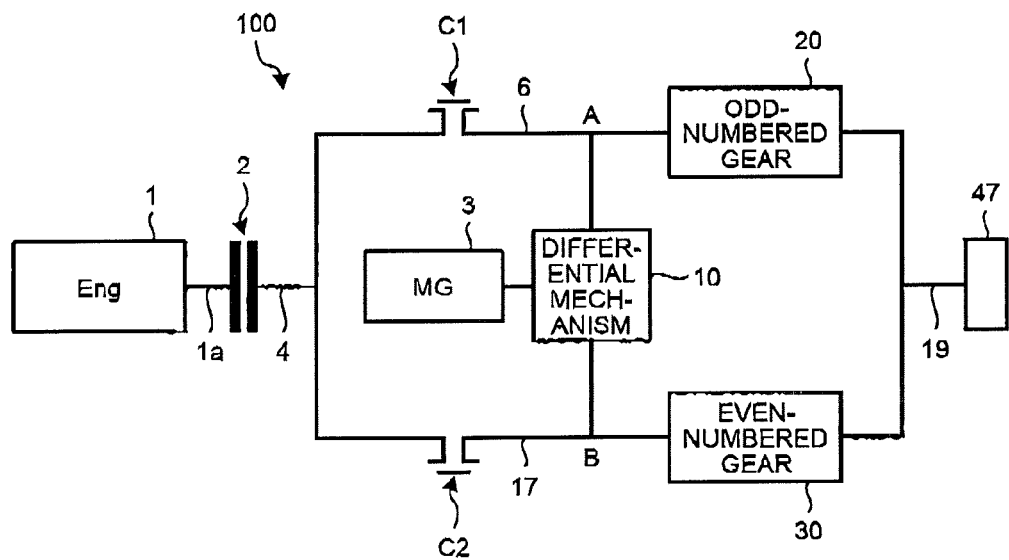
FIG. 1 is a schematic configuration diagram of a vehicle according to an embodiment.

An embodiment is described with reference to FIGS. 1 to 50. This embodiment relates to a driving device for vehicle. FIG. 1 is a schematic configuration diagram of a vehicle 100 according to the embodiment of the present invention, FIG. 2 is a view of an example of a configuration provided with a double-pinion planetary gear mechanism, and FIG. 3 is a skeleton diagram of the vehicle 100 according to this embodiment.

The vehicle 100 according to this embodiment has a hybrid structure which reduces gear shift shock with a differential mechanism and a rotating electrical machine added to a dual clutch transmission (DCT). The hybrid structure may reduce the gear shift shock by shifting gears while receiving reaction force of an engine by the rotating electrical machine at the time of gear shift. On the other hand, receiving the engine reaction force might increase an output of the rotating electrical machine at the time of the gear shift. A driving device for vehicle 1-1 according to this embodiment may decrease the output of the rotating electrical machine at the time of the gear shift by second gear shift control to be described later.

As illustrated in FIG. 1, the vehicle 100 includes an engine 1, a clutch 2, a rotating electrical machine 3, a differential mechanism 10, a first transmission unit 20, a second transmission unit 30, a first clutch C1, a second clutch C2, and a driving wheel 47. The driving device for vehicle 1-1 according to this embodiment includes the first transmission unit 20, the second transmission unit 30, and the differential mechanism 10. Meanwhile, the driving device for vehicle 1-1 may further include the engine 1, the rotating electrical machine 3, the first clutch C1, the second clutch C2, an ECU 50 to be described later and the like.

Figure 2:
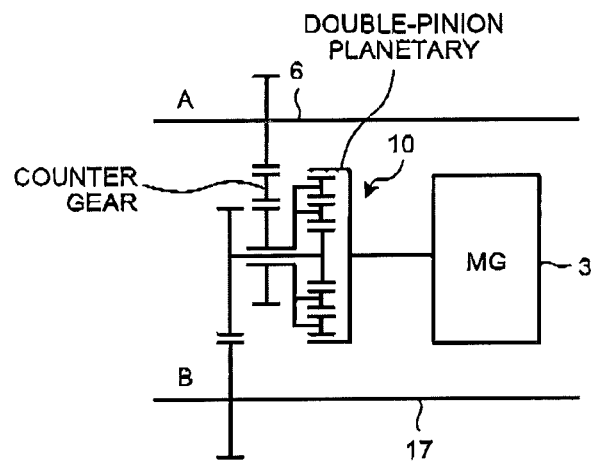
FIG. 2 is a view of an example of a configuration provided with a double-pinion planetary gear mechanism.
Figure 3:
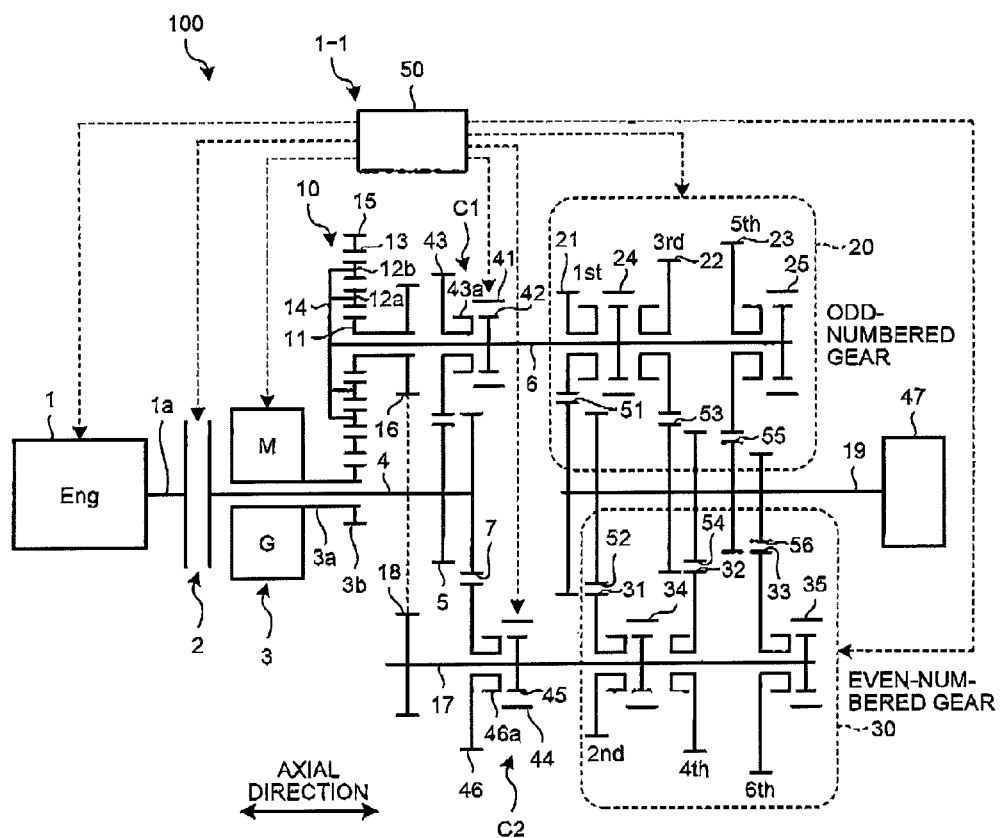
FIG. 3 is a skeleton diagram of the vehicle according to this embodiment.

A connection configuration in which the double-pinion planetary gear mechanism is used illustrated in FIG. 2 may be applied, for example, to the connection configuration of the rotating electrical machine 3, an input shaft 6 of the first transmission unit 20, an input shaft 17 of the second transmission unit 30, and the differential mechanism 10. The differential mechanism 10 of the driving device for vehicle 1-1 according to this embodiment is the double-pinion planetary gear mechanism as illustrated in FIG. 3.

The engine 1 converts combustion energy of fuel to rotary motion of a rotary shaft 1a to output. Meanwhile, another well-known engine may be mounted in place of the engine 1 as an engine of the vehicle 100. The rotary shaft 1a of the engine 1 is connected to a rotary shaft 4 through the clutch 2. The rotary shaft 4 is arranged coaxially with the rotary shaft 1a of the engine 1 on an elongated line of the rotary shaft 1a.

The clutch 2 is an automatic clutch device. The clutch 2 includes an input side engaging member connected to the rotary shaft 1a and an output side engaging member connected to the rotary shaft 4. The clutch 2 is engaged or disengaged by an actuator operated by hydraulic pressure and the like. The clutch 2 may be controlled to be in a fully-engaged state, a semi-engaged state, or a disengaged state according to the hydraulic pressure to be supplied.

The rotating electrical machine 3 is arranged coaxially with the rotary shaft 4 on an outer side in a radial direction of the rotary shaft 4. A rotary shaft 3a of the rotating electrical machine 3 is supported so as to be rotatable relative to the rotary shaft 4. Drive gears 5 and 7 are provided on the rotary shaft 4. The drive gears 5 and 7 are arranged on an end on an opposite side of the engine 1 of the rotary shaft 4. The drive gear 5 meshes with a driven gear 43. The driven gear 43 is arranged on the input shaft 6 of the first transmission unit 20. The drive gear 7 meshes with a driven gear 46. The driven gear 46 is arranged on the input shaft 17 of the second transmission unit 30. The rotary shaft 4, the input shaft 6 of the first transmission unit 20, the input shaft 17 of the second transmission unit 30, and an output shaft 19 are arranged so as to be parallel with one another. A gear ratio between the drive gear 5 and the driven gear 43 and that of the drive gear 7 and the driven gear 46 are equal to each other.

The differential mechanism 10, a drive gear 16, the first clutch C1, a drive gear 21, a sleeve 24, drive gears 22 and 23, and a sleeve 25 are arranged on the input shaft 6 in this order from a side of the engine 1.

The differential mechanism 10 connects the first transmission unit 20, the second transmission unit 30, and the rotating electrical machine 3. The differential mechanism 10 includes a sun gear 11, a first pinion gear 12a, a second pinion gear 12b, a ring gear 13, and a carrier 14. The ring gear 13 is arranged coaxially with the sun gear 11 on an outer side in a radial direction of the sun gear 11. The first pinion gear 12a and the second pinion gear 12b are arranged between the sun gear 11 and the ring gear 13. The first pinion gear 12a meshes with the sun gear 11 and the second pinion gear 12b. The second pinion gear 12b meshes with the first pinion gear 12a and the ring gear 13. The first pinion gear 12a and the second pinion gear 12b are rotatably supported by the carrier 14.

The sun gear 11 is supported coaxially with the input shaft 6 so as to be rotatable relative to the input shaft 6. The drive gear 16 is provided on a rotary shaft of the sun gear 11. The drive gear 16 meshes with a driven gear 18 arranged on the input shaft 17 of the second transmission unit 30. A gear ratio between the drive gear 16 and the driven gear 18 is 1. The input shaft 17 rotates in a direction opposite to a rotational direction of the sun gear 11 at a same rotational speed as that of the sun gear 11.

The carrier 14 is connected to the input shaft 6 to integrally rotate with the input shaft 6. Therefore, the first pinion gear 12a may rotate (revolve) around a central axis of the input shaft 6 together with the carrier 14 and may rotate (rotate) around a central axis of the first pinion gear 12a while being supported by the carrier 14. The second pinion gear 12b may rotate (revolve) around the central axis of the input shaft 6 together with the carrier 14 and may rotate (rotate) around a central axis of the second pinion gear 12b while being supported by the carrier 14.

An input gear 15 is provided on an outer peripheral surface of the ring gear 13. The input gear 15 meshes with an output gear 3b provided on the rotary shaft 3a of the rotating electrical machine 3. The rotating electrical machine 3 has a function as a motor (electric motor) and a function as a power generator. The rotating electrical machine 3 is connected to a battery through an inverter. The rotating electrical machine 3 is capable of converting electric power supplied from the battery to mechanical power to output and being driven by input power to convert the mechanical power to the electric power. The electric power generated by the rotating electrical machine 3 may be accumulated in the battery. An AC synchronous motor generator may be used, for example, as the rotating electrical machine 3.

The rotating electrical machine 3 may output torque by consuming the electric power to rotary drive the input gear 15 by the output torque at the time of power running. The rotating electrical machine 3 may be rotary driven by the torque transmitted from the input gear 15 to the output gear 3b to generate the electric power and allow load torque corresponding to power generation load to act on the input gear 15 at the time of regeneration.

The first clutch C1 is a clutch device which connects/disconnects the rotary shaft 4 to/from the input shaft 6 of the first transmission unit 20. The first transmission unit 20 is the transmission unit which forms an odd-numbered gear shift stage. The second clutch C2 is a clutch device which connects/disconnects the rotary shaft 4 to/from the input shaft 17 of the second transmission unit 30. The second transmission unit 30 is the transmission unit which forms an even-numbered gear shift stage. The rotating electrical machine 3, the input shaft 6 of the first transmission unit 20, and the input shaft 17 of the second transmission unit 30 are connected to one another through the differential mechanism 10. The first transmission unit 20 and the second transmission unit 30 are connected to the driving wheel 47 through the common output shaft 19. Meanwhile, the output shaft 19 is connected to the driving wheel 47 through a differential device and right and left driving shafts.

The first clutch C1 includes a sleeve 41, a fixed engaging element 42, and the driven gear 43. The fixed engaging element 42 is connected to the input shaft 6 to integrally rotate with the input shaft 6. The driven gear 43 is arranged coaxially with the input shaft 6 and supported so as to be rotatable relative to the input shaft 6. The driven gear 43 includes an engaging element 43a. The sleeve 41 engages/disengages the fixed engaging element 42 with/from the engaging element 43a of the driven gear 43 by being driven by an actuator to move in an axial direction.

When the fixed engaging element 42 is engaged with the engaging element 43a of the driven gear 43, the driven gear 43 is connected to the input shaft 6 and the driven gear 43 and the input shaft 6 integrally rotate. Therefore, in this case, the power is transmitted between the rotary shaft 4 and the input shaft 6. On the other hand, when the fixed engaging element 42 is disengaged from the engaging element 43a, the driven gear 43 is disconnected from the input shaft 6. In this case, power transmission between the rotary shaft 4 and the input shaft 6 through the first clutch C1 is blocked.

The first transmission unit 20 includes the input shaft 6, the drive gears 21, 22, and 23 of respective gears, the sleeves 24 and 25, driven gears 51, 53, and 55, and the output shaft 19. The first transmission unit 20 may further include the first clutch C1. The first transmission unit 20 is a shaft which connects the engine 1 to the driving shaft and may be connected/disconnected to/from the engine 1. In this embodiment, the first clutch C1 connects/disconnects the engine 1 to/from the first transmission unit 20.

The drive gears 21, 22, and 23 are supported so as to be rotatable relative to the input shaft 6. The driven gears 51, 53, and 55 are connected to the output shaft 19 to integrally rotate with the output shaft 19.

The drive gear 21 and the driven gear 51 form a gear pair of a first gear meshing with each other, the drive gear 22 and the driven gear 53 form a gear pair of a third gear meshing with each other, and the drive gear 23 and the driven gear 55 form a gear pair of a fifth gear meshing with each other.

The first transmission unit 20 may connect any one of the drive gears 21, 22, and 23 to the input shaft 6 by driving the sleeves 24 and 25 by an actuator to move the same in an axial direction. According to this, it is possible to connect the input shaft 6 to the output shaft 19 through the gear pair of any one of the odd-numbered gear shift stages which are the first, third, and fifth gear shift stages and transmit the rotation at a transmission gear ratio of the gear pair. The first transmission unit 20 may move the sleeves 24 and 25 in the axial direction to disengage all the drive gears 21, 22, and 23 to realize a neutral state. The first transmission unit 20 in the neutral state blocks the transmission of the power between the input shaft 6 and the output shaft 19.

The second clutch C2 includes a sleeve 44, a fixed engaging element 45, and the driven gear 46. The fixed engaging element 45 is the engaging element connected to the input shaft 17 to integrally rotate with the input shaft 17. The driven gear 46 is arranged coaxially with the input shaft 17 and supported so as to be rotatable relative to the input shaft 17. The driven gear 46 includes an engaging element 46a. The sleeve 44 engages/disengages the fixed engaging element 45 with/from the engaging element 46a of the driven gear 46 by being driven by an actuator to move in an axial direction.

When the fixed engaging element 45 is engaged with the engaging element 46a of the driven gear 46, the driven gear 46 is connected to the input shaft 17 and the driven gear 46 and the input shaft 17 integrally rotate. Therefore, in this case, the power is transmitted between the rotary shaft 4 and the input shaft 17. On the other hand, when the fixed engaging element 45 is disengaged from the engaging element 46a, the driven gear 46 is disconnected from the input shaft 17. In this case, the power transmission between the rotary shaft 4 and the input shaft 17 through the second clutch C2 is blocked.

The second transmission unit 30 includes the input shaft 17, drive gears 31, 32, and 33 of respective gears, sleeves 34 and 35, driven gears 52, 54, and 56, and the output shaft 19. The second transmission unit 30 may further include the second clutch C2. The driven gear 18, the second clutch C2, the drive gear 31, the sleeve 34, the drive gears 32 and 33, and the sleeve 35 are arranged on the input shaft 17 of the second transmission unit 30 in this order from a side of the engine 1. The second transmission unit 30 is a shaft which connects the engine 1 to the driving shaft and may be connected/disconnected to/from the engine 1. In this embodiment, the second clutch C2 connects/disconnects the engine 1 to/from the second transmission unit 30.

The drive gears 31, 32, and 33 are supported so as to be rotatable relative to the input shaft 17. The driven gears 52, 54, and 56 are connected to the output shaft 19 to integrally rotate with the output shaft 19.

The drive gear 31 and the driven gear 52 form a gear pair of a second gear shift stage meshing with each other, the drive gear 32 and the driven gear 54 form a gear pair of a fourth gear shift stage meshing with each other, and the drive gear 33 and the driven gear 56 form a gear pair of a sixth gear shift stage meshing with each other.

The second transmission unit 30 may connect any one of the drive gears 31, 32, and 33 to the input shaft 17 by driving the sleeves 34 and 35 by an actuator to move the same in an axial direction. According to this, it is possible to connect the input shaft 17 to the output shaft 19 through the gear pair of any one of the even-numbered gear shift stages which are the second, fourth, and sixth gear shift stages and transmit the rotation at the transmission gear ratio of the gear pair. The second transmission unit 30 may move the sleeves 34 and 35 in the axial direction to disengage all the drive gears 31, 32, and 33 to realize the neutral state. The second transmission unit 30 in the neutral state blocks the transmission of the power between the input shaft 17 and the output shaft 19.

The ECU 50 is mounted on the vehicle 100. The ECU 50 is an electronic control unit including a computer. The ECU 50 has a function as a control device which controls each unit of the vehicle 100. The ECU 50 is electrically connected to the engine 1, the clutch 2, the rotating electrical machine 3, the first clutch C1, the second clutch C2, the first transmission unit 20, and the second transmission unit 30, and may control the engine 1, the clutch 2, the rotating electrical machine 3, the first clutch C1, the second clutch C2, the first transmission unit 20, and the second transmission unit 30.

The vehicle 100 according to this embodiment may execute engine driving and EV driving. The engine driving is a driving mode to engage the clutch 2 and drive the vehicle 100 by using the engine 1 as a power source. In the engine driving, it is possible to drive the vehicle 100 by transmitting engine torque to the driving wheel 47 through any one of the first transmission unit 20 and the second transmission unit 30.

The EV driving is a driving mode to drive the vehicle 100 by using the rotating electrical machine 3 as the power source. In the EV driving, it is possible to disengage the clutch 2 and drive the vehicle 100 while stopping the engine 1. In the EV driving, it is possible that the rotating electrical machine 3 outputs the torque by the power running and rotary drives the driving wheel 47 to drive the vehicle 100 and that the rotating electrical machine 3 performs the regeneration to generate the electrical power by being rotary driven by the torque transmitted from the driving wheel 47.

The ECU 50 may appropriately switch between the engine driving and the EV driving based on required driving force, a vehicle speed, a state of charge of the battery and the like. The engine driving and the EV driving may also be switched based on a user request. The ECU 50 may also allow the rotating electrical machine 3 to perform the regeneration at the time of deceleration of the vehicle 100. For example, this may execute the regeneration when a brake pedal is depressed to generate regenerative braking force.

The ECU 50 may perform gear shift control of the first transmission unit 20 and the second transmission unit 30. When the ECU 50 detects a target gear shift stage, this controls the first transmission unit 20 and the second transmission unit 30 to execute the gear shift to the target gear shift stage. The target gear shift stage may be based on shift operation of a user or may be automatically selected based on a driving state. The vehicle 100 according to this embodiment includes the first transmission unit 20 forming the odd-numbered gear shift stage and the second transmission unit 30 forming the even-numbered gear shift stage, and may execute upshift or downshift with excellent responsiveness. For example, at the time of the upshift to the second gear shift stage during the driving in the first gear shift stage, the ECU 50 forms the second gear shift stage in the second transmission unit 30 in advance and switches a power transmission path from the power source to the driving wheel 47 from the first transmission unit 20 to the second transmission unit 30. According to this, the gear shift may be completed in a shorter time than that in a case in which the gear shift stage is shifted in the same transmission unit.

Figure 4:
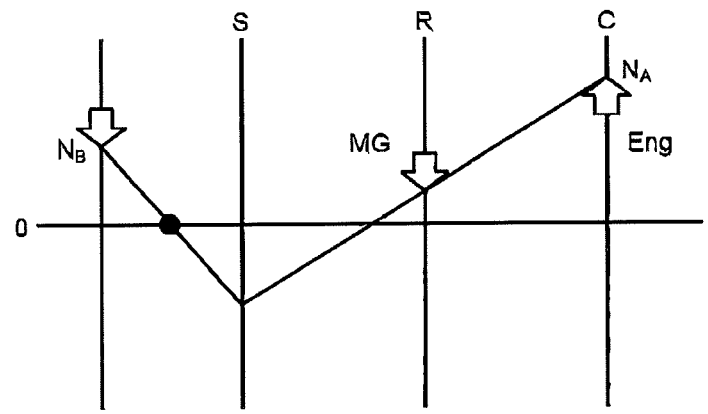
FIG. 4 is a view of an example of an alignment chart of a differential mechanism at the time of gear shift.

Herein, it is possible to shift gear shift stages while receiving the reaction force of the engine 1 by the rotating electrical machine 3 at the time of the gear shift. FIG. 4 is a view of an example of an alignment chart of the differential mechanism 10 at the time of the gear shift. In FIG. 4, a rotational speed of the sun gear 11 is plotted along an S axis, a rotational speed of the ring gear 13 is plotted along an R axis, and a rotational speed $N_A$ of the carrier 14 and the input shaft 6 of the first transmission unit 20 is plotted along a C axis. A rotational speed $N_B$ of the input shaft 17 of the second transmission unit 30 is plotted along a leftmost axis. FIG. 4 is the alignment chart when the first clutch C1 is engaged and the engine 1 is connected to the input shaft 6 of the first transmission unit 20. Since the rotating electrical machine 3 receives the reaction force of the engine 1, the engine torque is transmitted from the sun gear 11 to the second transmission unit 30. The rotating electrical machine 3 receives the reaction force to change the transmission path of the power, so that shock at the time of the gear shift is suppressed.

Figure 11:
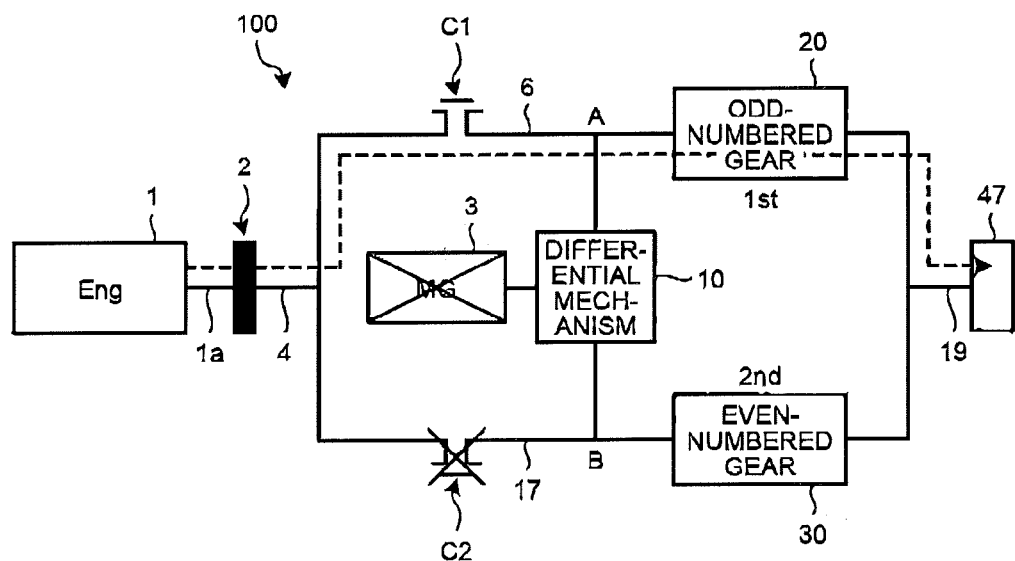
FIG. 11 is a view of the driving in the first gear shift stage.
Figure 12:
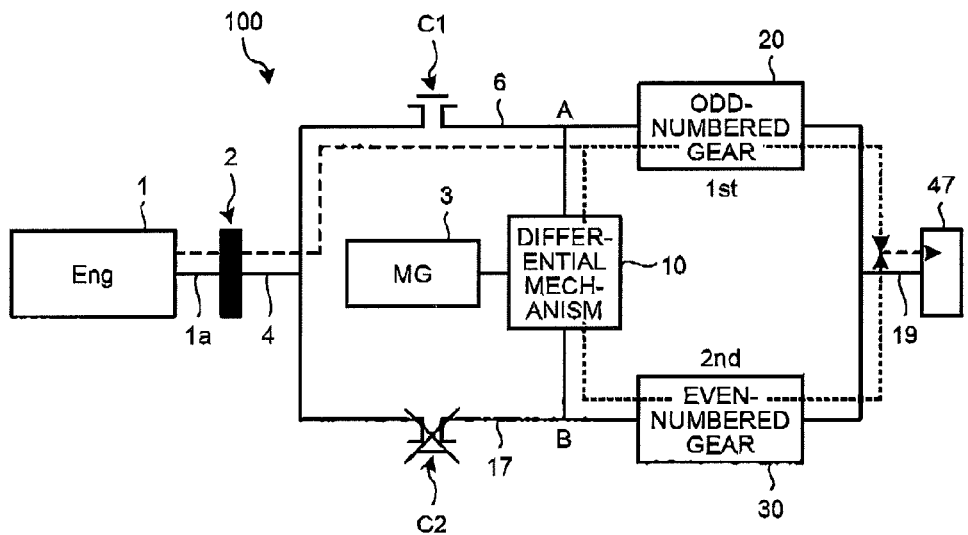
FIG. 12 is a first view of a procedure of the first gear shift control.
Figure 14:
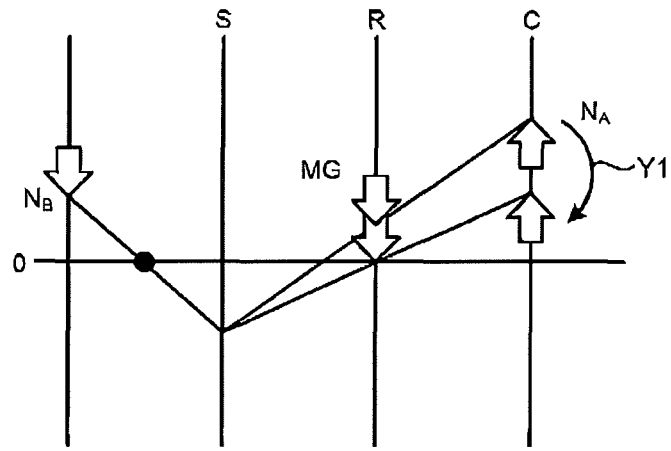
FIG. 14 is a view of the rotational speed control of the first gear shift control.
Figure 15:
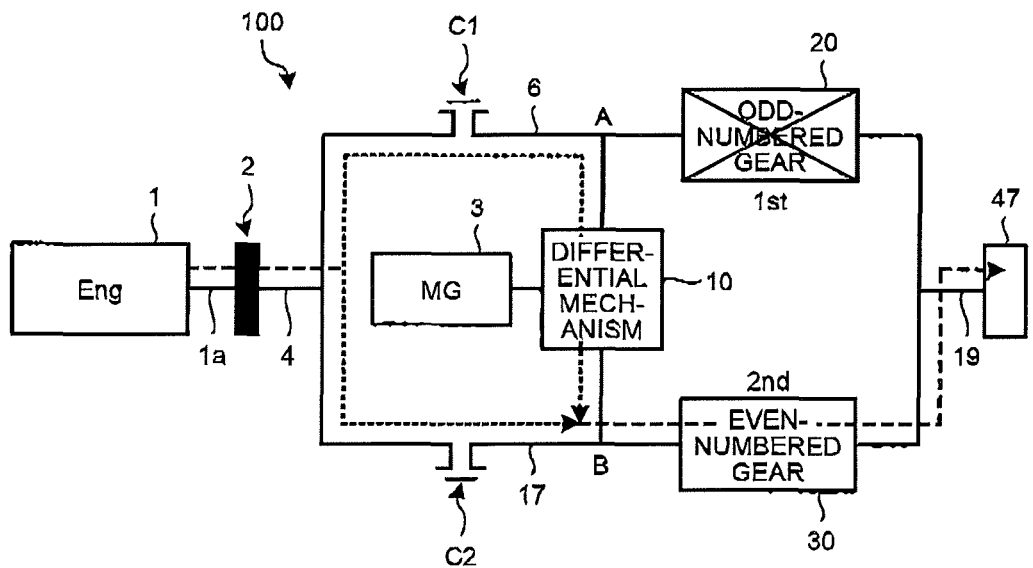
FIG. 15 is a third view of the procedure of the first gear shift control.
Figure 16:
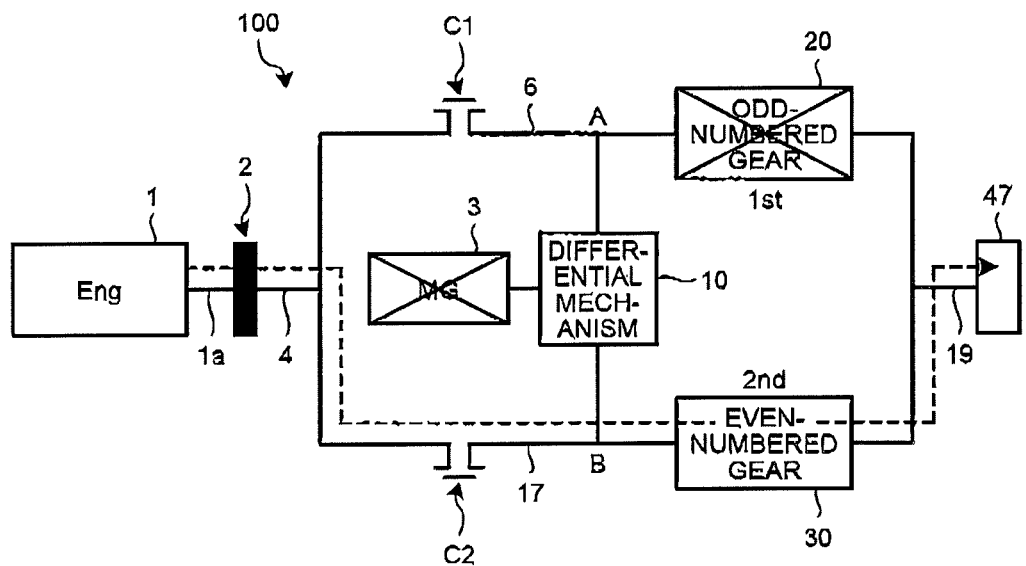
FIG. 16 is a view of the driving in the second gear shift stage.

The rotating electrical machine 3 receives the reaction force of the engine 1 at the time of the gear shift in this manner, so that the output of the rotating electrical machine 3 (output of the inverter and the battery) problematically increases in first gear shift control to be described hereinafter. FIG. 11 is a view of the driving in the first gear shift stage, FIG. 12 is a first view of a procedure of the first gear shift control, FIG. 13 is a second view of the procedure of the first gear shift control, FIG. 14 is a view of rotational speed control of the first gear shift control, FIG. 15 is a third view of the procedure of the first gear shift control, and FIG. 16 is a view of the driving in the second gear shift stage.

The engine driving in the odd-numbered gear shift stage is a state in which the first transmission unit 20 is connected to the engine 1 and the engine 1 is connected to the driving shaft through the gear shift stage of the first transmission unit 20. Specifically, as illustrated in FIG. 11, for example, in the first gear shift stage, the clutch 2 and the first clutch C1 are engaged and the first gear shift stage is formed in the first transmission unit 20. The second clutch C2 is disengaged and the rotating electrical machine 3 is in a free state. According to this, the engine torque is transmitted from the rotary shaft 4 to the input shaft 6 through the first clutch C1 to be transmitted to the driving wheel 47 through the first transmission unit 20. In the second transmission unit 30, the second gear shift stage is formed in preparation for the upshift.

When the upshift to the second gear shift stage is determined, the engine torque is changed to target engine torque after the gear shift. As illustrated in FIG. 12, the rotating electrical machine 3 receives the reaction force of the engine 1, so that the power transmission path is changed. The power is transmitted from the input shaft 6 of the first transmission unit 20 to the input shaft 17 of the second transmission unit 30 through the differential mechanism 10. Therefore, the engine torque is transmitted to the driving wheel 47 through the first transmission unit 20 and the second transmission unit 30.

Figure 13:
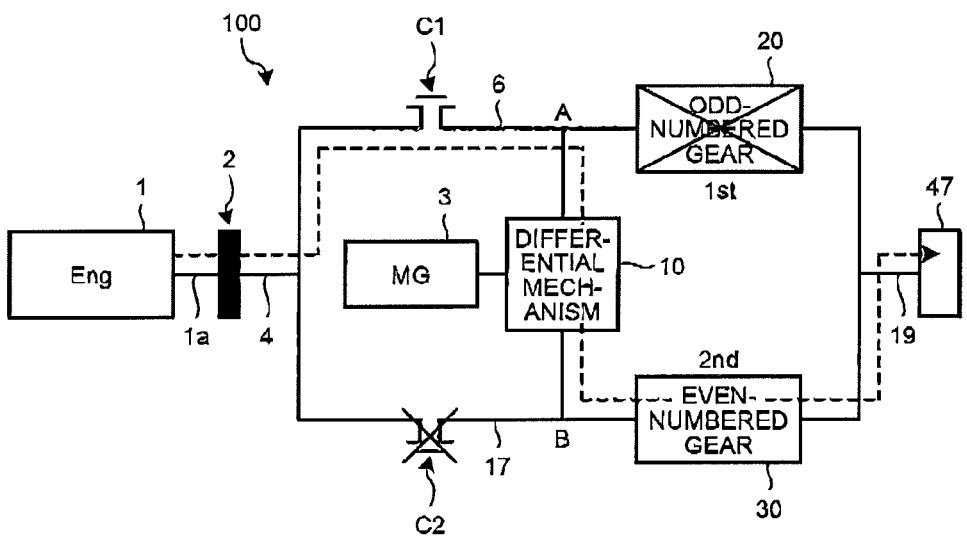
FIG. 13 is a second view of the procedure of the first gear shift control.

Next, the first transmission unit 20 is put into the neutral state as illustrated in FIG. 13. According to this, the engine torque is transmitted to the driving wheel 47 through the input shaft 6, the differential mechanism 10, and the second transmission unit 30. As indicated by arrow Y1 in FIG. 14, an engine speed (rotational speed $N_A$ of the input shaft 6) is adjusted to a target speed after the gear shift, herein, the same speed as the rotational speed $N_B$ of the input shaft 17 of the second transmission unit 30. When the engine speed is adjusted, the second clutch C2 is engaged as illustrated in FIG. 15.

Next, the rotating electrical machine 3 stops receiving the reaction force and the power transmission path is changed. Since the rotating electrical machine 3 becomes free, the power transmission between the input shaft 6 and the input shaft 17 through the differential mechanism 10 is blocked and it shifts to the driving in the second gear shift stage as illustrated in FIG. 16. The engine torque is transmitted from the rotary shaft 4 to the input shaft 17 through the second clutch C2 to be transmitted to the driving wheel 47 through the second transmission unit 30 as illustrated in FIG. 16.

In the first gear shift control in which the gear shift is performed in this procedure, the rotating electrical machine 3 is put into a state in which this outputs negative torque and normally rotates, that is to say, a regenerative state during the gear shift as illustrated in FIG. 14. Herein, normal rotation is the rotation in a rotational direction of the carrier 14 when the first clutch C1 is engaged at the time of forward movement of the vehicle 100. The rotating electrical machine 3 performs the regeneration, so that energy output at the driving wheel 47 becomes smaller than the energy output from the engine 1. Therefore, it is required to enlarge the engine torque during the gear shift, so that the output of the rotating electrical machine 3 also increases in accordance with this.

The driving device for vehicle 1-1 according to this embodiment may allow the rotating electrical machine 3 to perform the power running during the gear shift in the gear shift control as described hereinafter. According to this, the energy output at the driving wheel 47 becomes larger than the energy output from the engine 1. Therefore, it is possible to decrease the engine torque and decrease the output of the rotating electrical machine 3 in accordance with this. In this specification, the gear shift control according to this embodiment described hereinafter is also referred to as "second gear shift control".

In this embodiment, the first transmission unit 20 corresponds to a first shaft and the second transmission unit 30 corresponds to a second shaft in the upshift from the odd-numbered gear shift stage to the even-numbered gear shift stage. On the other hand, in the upshift from the even-numbered gear shift stage to the odd-numbered gear shift stage, the second transmission unit 30 corresponds to the first shaft and the first transmission unit 20 corresponds to the second shaft.

Figure 5:
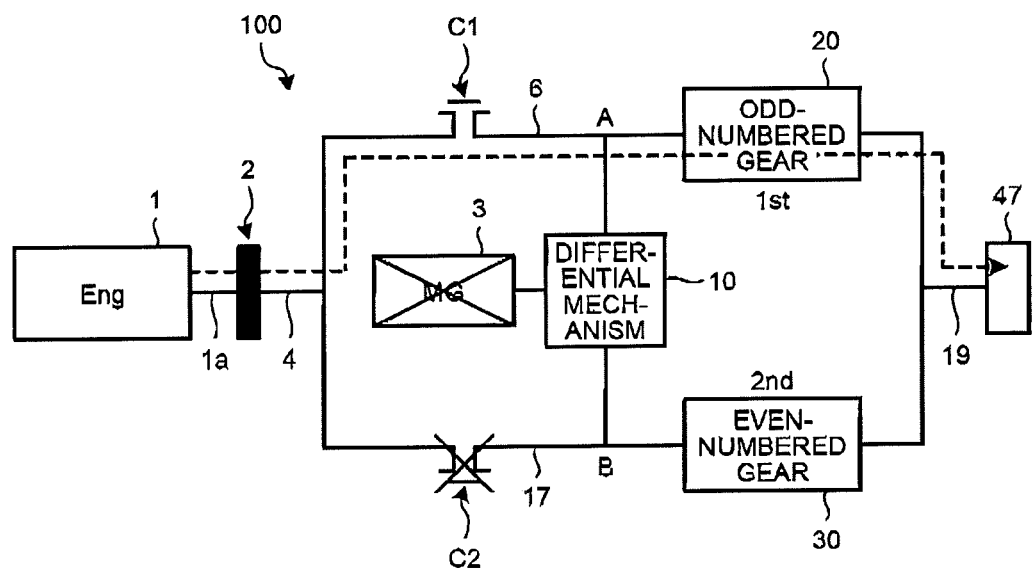
FIG. 5 is a view of driving in a first gear shift stage.
Figure 6:
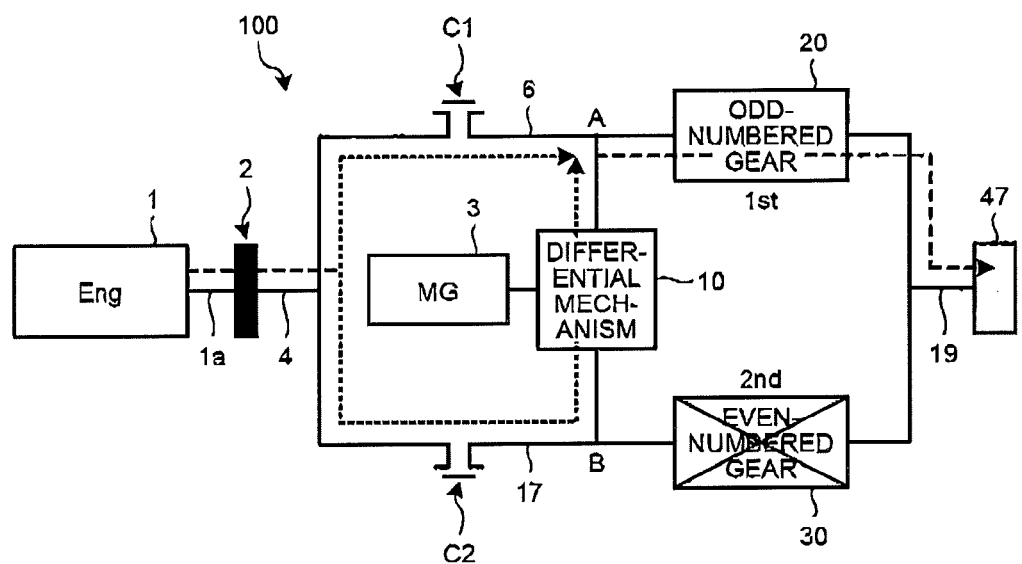
FIG. 6 is a first view of a procedure of second gear shift control.
Figure 7:
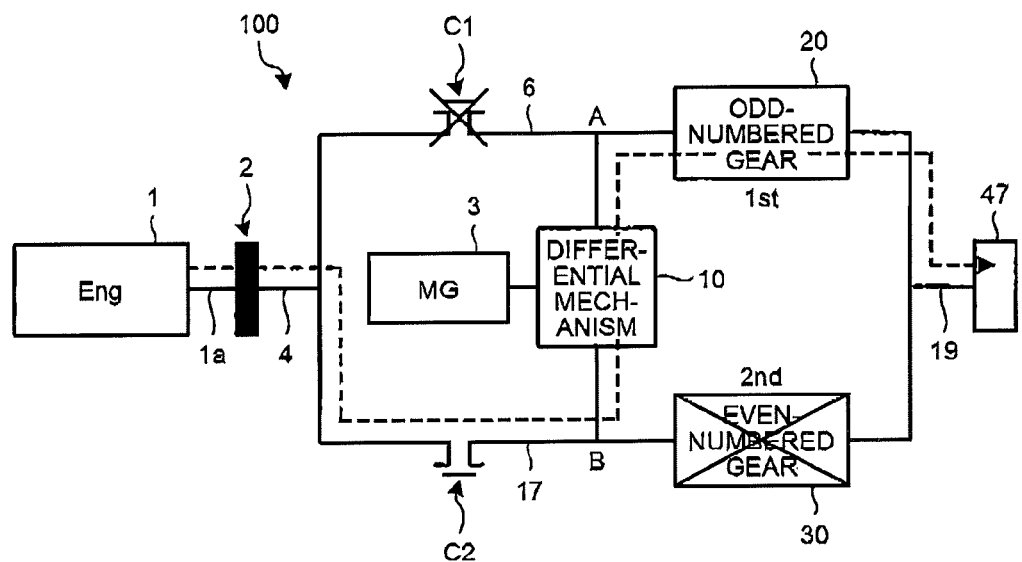
FIG. 7 is a second view of the procedure of the second gear shift control.
Figure 8:
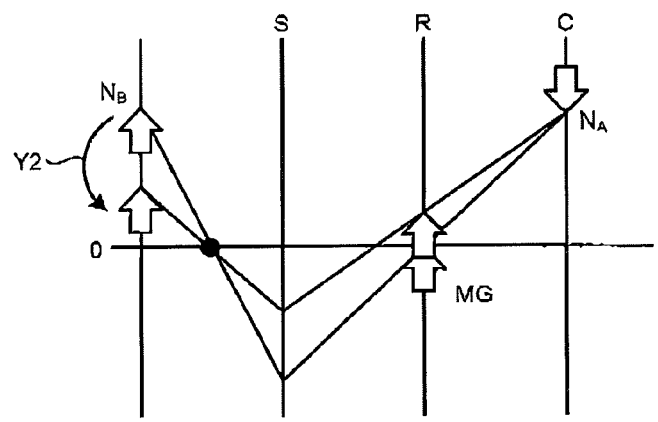
FIG. 8 is a view of rotational speed control of the second gear shift control.
Figure 9:
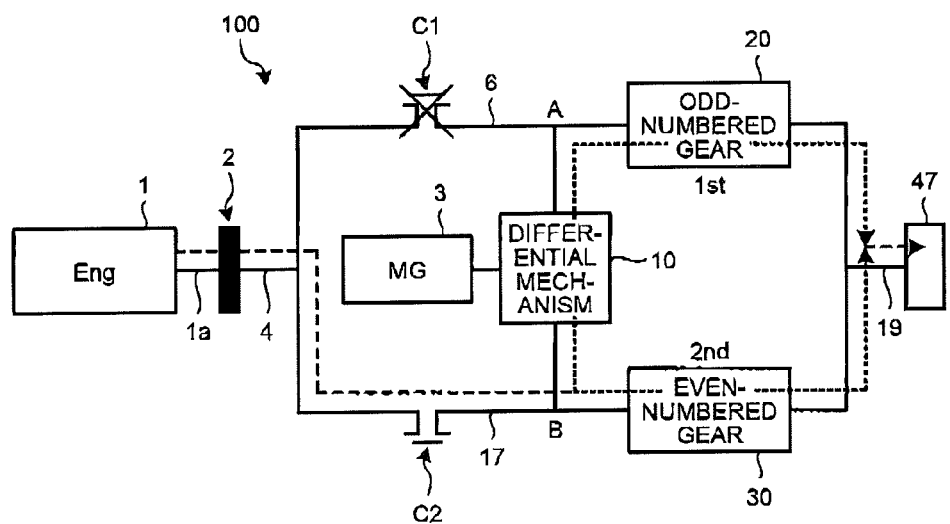
FIG. 9 is a third view of the procedure of the second gear shift control.
Figure 10:
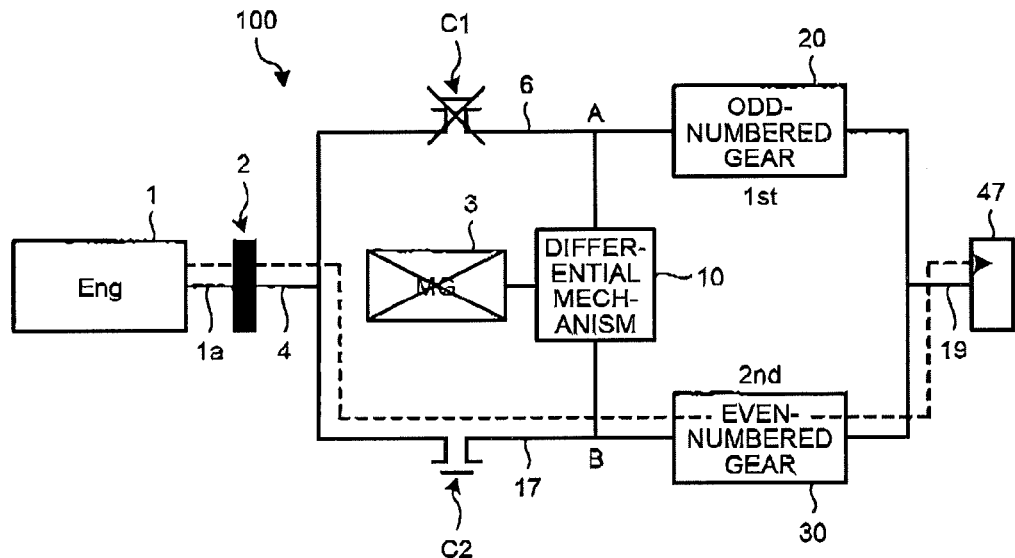
FIG. 10 is a view of driving in a second gear shift stage.

FIG. 5 is a view of the driving in the first gear shift stage, FIG. 6 is a first view of a procedure of the second gear shift control, FIG. 7 is a second view of the procedure of the second gear shift control, FIG. 8 is a view of rotational speed control of the second gear shift control, FIG. 9 is a third view of the procedure of the second gear shift control, and FIG. 10 is a view of the driving in the second gear shift stage.

When the upshift to the second gear shift stage is determined during the driving in the first gear shift stage (FIG. 5), the ECU 50 puts the second transmission unit 30 into the neutral state, makes the rotational speed $N_B$ of the input shaft 17 of the second transmission unit 30 the same as the rotational speed $N_A$ of the input shaft 6 of the first transmission unit 20, and engages the second clutch C2 as illustrated in FIG. 6. The rotational speed is adjusted by the rotating electrical machine 3. The second transmission unit 30 is put into the neutral state, so that the power transmission to the driving shaft through the second transmission unit 30 is blocked. Since the second clutch C2 is engaged, the second transmission unit 30 is connected to the engine 1.

Further, the ECU 50 decreases the engine torque and allows the rotating electrical machine 3 to receive the reaction force of the engine 1. According to this, the power transmission path is changed. That is to say, the ECU 50 transmits the power of the engine 1 to the input shaft 17 of the second transmission unit 30 by output control of the rotating electrical machine 3. Specifically, as illustrated in FIG. 6, the engine torque is transmitted not only from the rotary shaft 4 to the input shaft 6 through the first clutch C1 but also from the rotary shaft 4 to the input shaft 17 through the second clutch C2. The power input to the input shaft 17 is transmitted to the input shaft 6 through the differential mechanism 10. Magnitude of the power transmitted to the input shaft 17 changes according to the output of the rotating electrical machine 3. The larger the torque output by the rotating electrical machine 3 as the motor, the larger the power transmitted from the rotary shaft 4 to the input shaft 17. Meanwhile, it may also be said that the ECU 50 transmits the power of the engine 1 to the input shaft 17 of the second transmission unit 30 by the output control of the engine 1 and the rotating electrical machine 3.

Next, the ECU 50 puts the first clutch C1 into the neutral state and changes the engine speed. As illustrated in FIG. 7, since the first clutch C1 is put into the neutral state, the first transmission unit 20 is disconnected from the engine 1 and the power transmission through the first clutch C1 is blocked. According to this, the engine torque is transmitted from the rotary shaft 4 to the input shaft 6 through the second clutch C2, the input shaft 17, and the differential mechanism 10 to be output to the driving wheel 47 through the first transmission unit 20. The ECU 50 changes the rotational speed $N_B$ of the input shaft 17 of the second transmission unit 30 to the rotational speed corresponding to the second gear shift stage as indicated by arrow Y2 in FIG. 8.

Next, the ECU 50 shifts the gear shift stage of the second transmission unit 30 to the second gear shift stage. According to this, as illustrated in FIG. 9, the engine torque transmitted to the input shaft 17 through the second clutch C2 is not only transmitted to the driving wheel 47 through the differential mechanism 10 and the first transmission unit 20 but also transmitted to the driving wheel 47 through the second transmission unit 30. That is to say, the engine 1 is connected to the driving shaft through the gear shift stage of the second transmission unit 30. The ECU 50 further allows the rotating electrical machine 3 to stop receiving the reaction force to change the power transmission path. Since the rotating electrical machine 3 becomes free, the power transmission between the input shaft 6 and the input shaft 17 through the differential mechanism 10 is blocked and it shifts to the driving in the second gear shift stage as illustrated in FIG. 10. The engine torque is transmitted from the rotary shaft 4 to the input shaft 17 to be transmitted to the driving wheel 47 through the second transmission unit 30 as illustrated in FIG. 10.

In the gear shift control (second gear shift control) according to this embodiment, as illustrated in FIG. 8, the rotating electrical machine 3 is put into a state in which this outputs normal torque and normally rotates, that is to say, a power running state during the gear shift. Therefore, it is possible to decrease the engine torque at the time of the gear shift as compared to a case in which the first gear shift control is performed and the rotating electrical machine 3 is put into the regenerative state, and as a result, it is possible to decrease the output of the rotating electrical machine 3.

Herein, although the second gear shift control has an advantage that the output of the rotating electrical machine 3 may be small, the number of steps in the procedure of the gear shift is larger than that of the first gear shift control. In the second gear shift control, a procedure in which the second transmission unit 30 is put into the neutral state, the rotational speed $N_B$ of the input shaft 17 of the second transmission unit 30 is made the same as the rotational speed $N_A$ of the input shaft 6, and the second clutch C2 is engaged (hereinafter, also referred to as "predetermined procedure") is performed when the gear shift is started. By execution of the predetermined procedure, time for the gear shift in the second gear shift control becomes longer than that in the first gear shift control and drivability might be deteriorated.

Therefore, for example, it is also possible to execute the second gear shift control when the output of the rotating electrical machine 3 at the time of the gear shift is larger than a predetermined output W0 in the first gear shift control and execute the first gear shift control when this is not larger than the predetermined output W0. The predetermined output W0 is desirably determined from a viewpoint of cost-effectiveness of fuel consumption. For example, when the rotating electrical machine 3 is made larger for the large output at the time of the gear shift by the first gear shift control, cost is increased, so that this is not preferable. Therefore, it is preferable to determine an allowable maximum output of the rotating electrical machine 3 from the viewpoint of the cost-effectiveness. The predetermined output W0 may be determined as a value not larger than the allowable maximum output.

Figure 17:
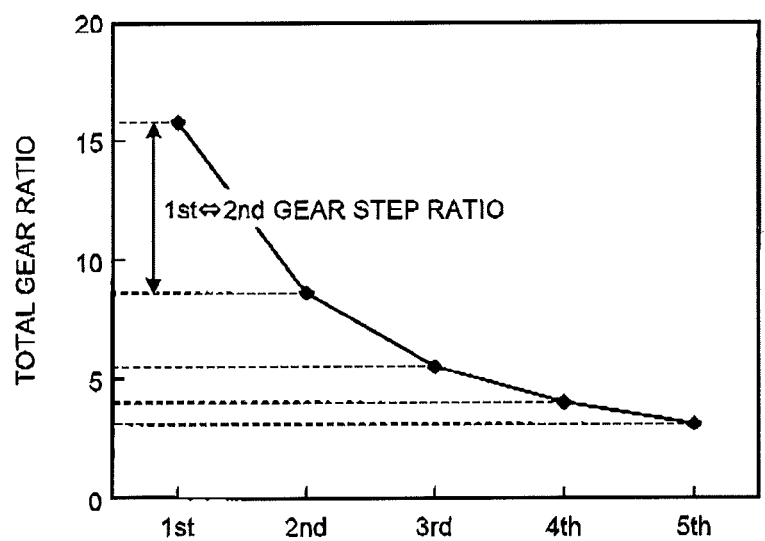
FIG. 17 is a view of a total gear ratio and a gear step ratio.
Figure 18:
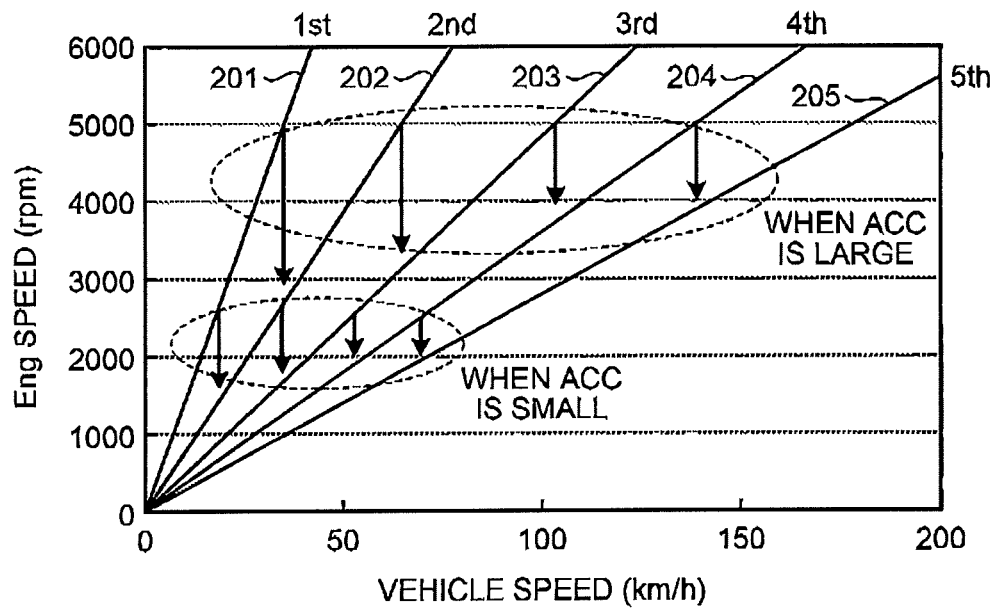
FIG. 18 is a view of relationship between a vehicle speed and an engine speed.

Herein, the output of the rotating electrical machine 3 at the time of the gear shift changes according to the gear shift stage and accelerator opening ACC. FIG. 17 is a view of a total gear ratio and a gear step ratio, FIG. 18 is a view of relationship between the vehicle speed and the engine speed, and FIG. 19 is a view of a gear shift map according to this embodiment.

As illustrated in FIG. 17, the gear step ratio is larger and an engine speed variation at the time of the gear shift is larger in a low gear shift stage than in a high gear shift stage. The gear step ratio is a ratio of gear ratios of two gear shift stages. For example, the gear step ratio between the first gear shift stage (gear ratio $G_{1st}$) and the second gear shift stage (gear ratio $G_{2nd}$) is calculated by $G_{1st}/G_{2nd}$. FIG. 16 illustrates relationship 201 between the vehicle speed and the engine speed in the first gear shift stage, relationship 202 between the vehicle speed and the engine speed in the second gear shift stage, relationship 203 between the vehicle speed and the engine speed in the third gear shift stage, relationship 204 between the vehicle speed and the engine speed in the fourth gear shift stage, and relationship 205 between the vehicle speed and the engine speed in the fifth gear shift stage. As is clear from FIG. 18, the engine speed variation according to the gear shift when the accelerator opening ACC is large is larger than the engine speed variation according to the gear shift when the accelerator opening ACC is small. When the accelerator opening ACC is large, the torque transmitted from the engine 1 to the driving wheel 47 is also large and the engine torque is large corresponding to this.

That is to say, the output of the rotating electrical machine 3 is large in the gear shift when the accelerator opening ACC is large in the low gear shift stage and the output of the rotating electrical machine 3 is small in the gear shift when the accelerator opening ACC is small in the high gear shift stage. Therefore, the output W of the rotating electrical machine 3 at the time of the gear shift may be predicted based on the gear shift stages before and after the gear shift and the accelerator opening ACC. It is possible to create the gear shift map in advance indicating whether to execute the first gear shift control or the second gear shift control.

Figure 19:
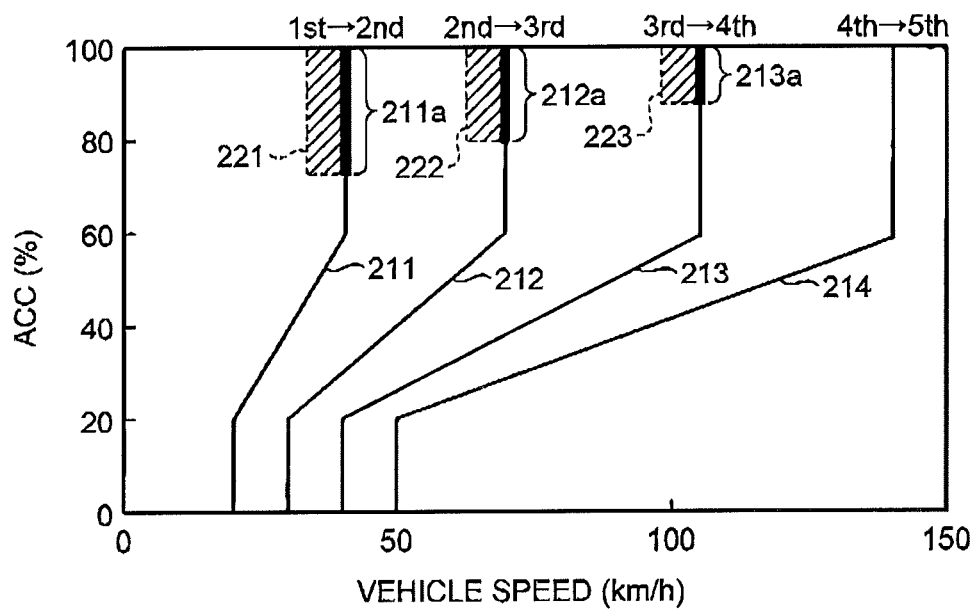
FIG. 19 is a view of a gear shift map according to this embodiment.

Gear shift lines 211, 212, 213, and 214 are determined in the gear shift map illustrated in FIG. 19. Ranges in which the second gear shift control is performed (hereinafter, referred to as "predetermined gear shift ranges") 211a, 212a, and 213a are determined in the gear shift line 211 of the first and second gear shift stages, the gear shift line 212 of the second and third gear shift stages, and the gear shift line 213 of the third and fourth gear shift stages, respectively. The predetermined gear shift ranges 211a, 212a, and 213a are the ranges of high accelerator opening in the gear shift lines 211, 212, and 213, respectively. When a trajectory of an operation point of the vehicle 100 intersects with the predetermined gear shift ranges 211a, 212a, and 213a, the second gear shift control is performed. On the other hand, when the trajectory of the operation point of the vehicle 100 intersects with a range other than the predetermined gear shift ranges 211a, 212a, and 213a in the gear shift lines 211, 212, and 213, respectively, the first gear shift control is performed.

Widths in an accelerator opening axis direction of the predetermined gear shift ranges 211a, 212a, and 213a are larger in the low gear shift stages. Gear shift preparation ranges 221, 222, and 223 are determined for the predetermined gear shift ranges 211a, 212a, and 213a, respectively. The gear shift preparation ranges 221, 222, and 223 are provided so as to be adjacent to the predetermined gear shift ranges 211a, 212a, and 213a, respectively, on a lower vehicle speed side. Widths in a vehicle speed axis direction of the gear shift preparation ranges 221, 222, and 223 may be made constant, for example. The gear shift preparation ranges 221, 222, and 223 are the ranges in which it is predicted that the second gear shift control is executed, the range in which the second gear shift control is highly possibly executed.

The ECU 50 executes the above-described predetermined procedure when the operation point of the vehicle 100 becomes the operation point in the gear shift preparation ranges 221, 222, and 223. For example, when the operation point enters the gear shift preparation range 221 during the driving in the first gear shift stage, the predetermined procedure is performed. According to this, it becomes possible to put the second transmission unit 30 into the neutral state, make the rotational speed $N_B$ of the input shaft 17 of the second transmission unit 30 the same as the rotational speed $N_A$ of the input shaft 6, and engage the second clutch C2 in advance before the gear shift to shift up is determined. Therefore, time required from determination of the gear shift to completion of the gear shift is shortened. For example, the upshift may be performed within the time comparable to that of the first gear shift control.

Meanwhile, there may be a case in which a part of the predetermined procedure is not executed or a part of the predetermined procedure cannot be executed before the gear shift is determined when the operation point of the vehicle 100 becomes the operation point in the gear shift preparation ranges 221, 222, and 223. For example, it is possible that only the step to put the second transmission unit 30 into the neutral state and block the power transmission to the driving shaft through the second shaft is executed out of the predetermined procedure and the engagement of the second clutch C2 may be omitted.

Prediction of the upshift is not limited to that using the gear shift preparation ranges 221, 222, and 223. The upshift may also be predicted by another method. The predetermined procedure may be executed not only when the upshift by the second gear shift control is predicted but also when the upshift is predicted between two successive gear shift stages with an intermediate gear shift stage interposed therebetween.

Meanwhile, charge/discharge ability and the like of the battery momentarily changes depending on a parameter such as a state of charge SOC and a temperature environment, so that a condition to perform the gear shift control of this embodiment may be changed based on the parameter.

Figures 20, 21:
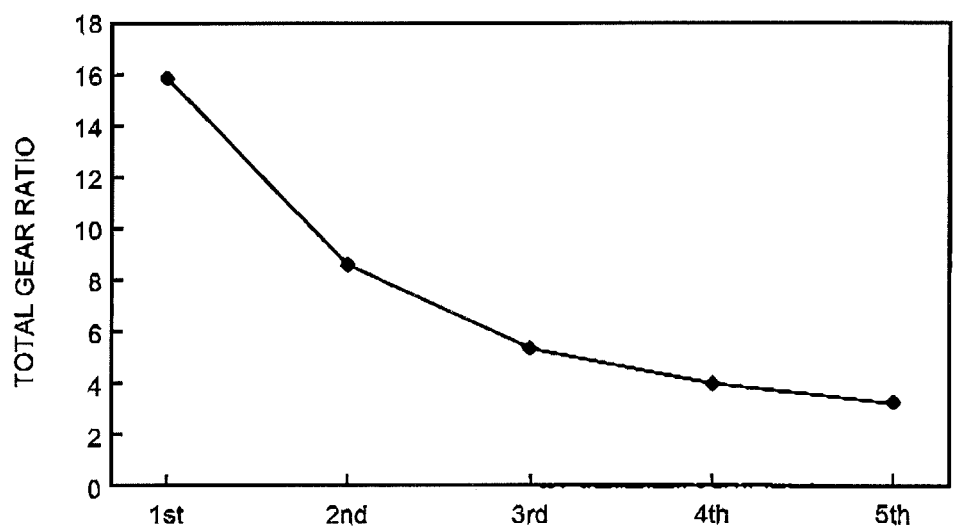
FIG. 20 is a view of an example of a gear ratio.
FIG. 21 is a view of a total gear ratio of each gear shift stage.
Figure 24:
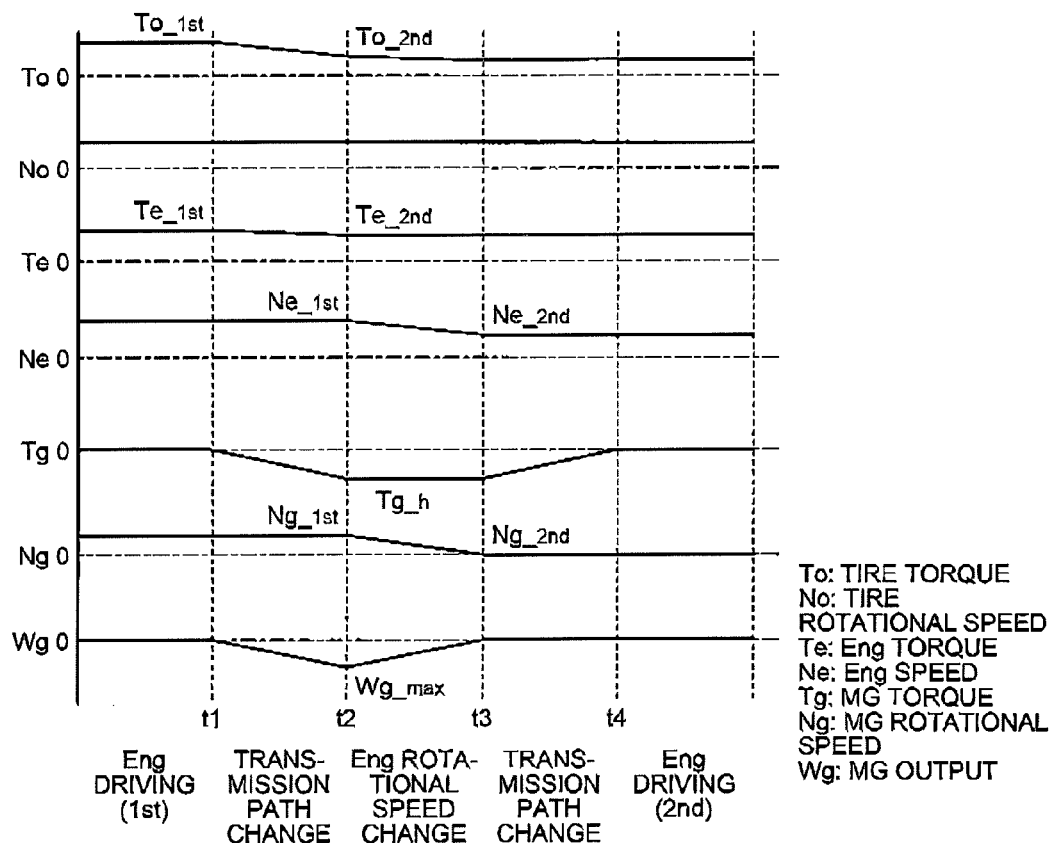
FIG. 24 is a time chart according to the first gear shift control.
Figure 25:
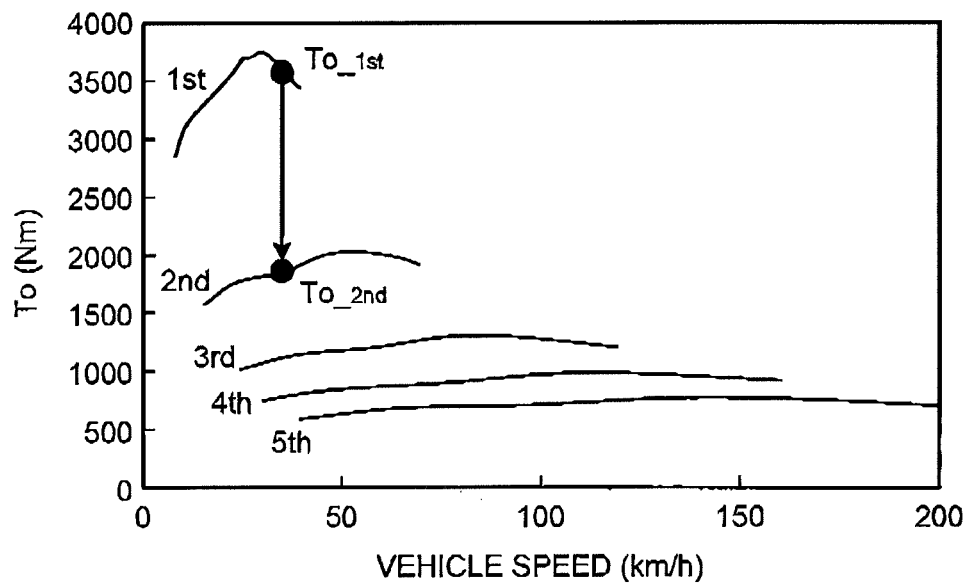
FIG. 25 is a view of change in tire torque according to the first gear shift control.
Figure 26:
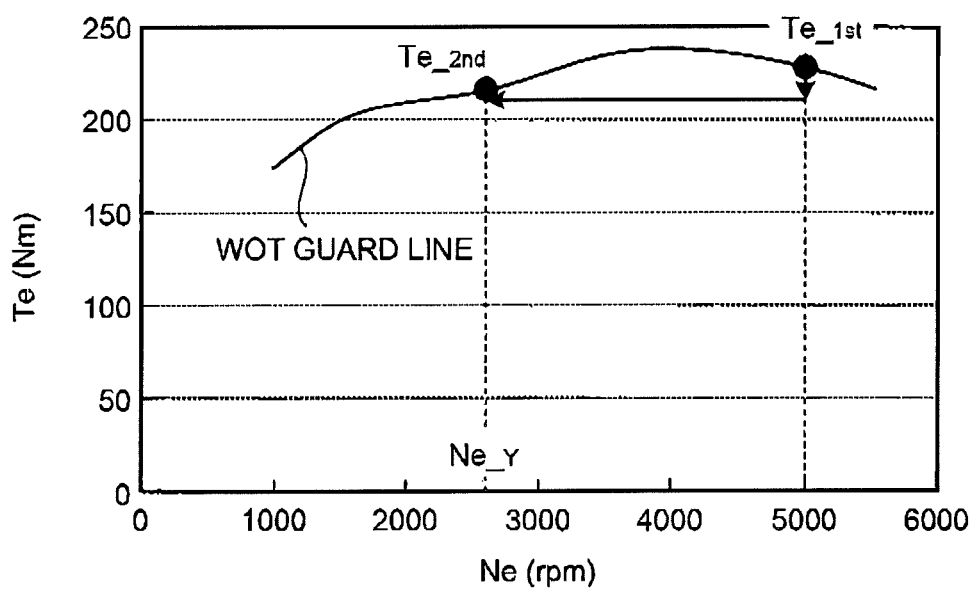
FIG. 26 is a view of transition of an engine operation point according to the first gear shift control.

Next, an effect by the second gear shift control is described with reference to an example of actual numbers. FIG. 20 is a view of an example of the gear ratio, FIG. 21 is a view of the total gear ratio of each gear shift stage, FIG. 22 is a view of relationship between the vehicle speed and the engine speed; FIG. 23 is a view of a calculation result according to the first gear shift control, FIG. 24 is a time chart according to the first gear shift control, FIG. 25 is a view of change in tire torque according to the first gear shift control, and FIG. 26 is a view of transition of the engine operation point according to the first gear shift control.

The calculation result illustrated in FIG. 23 is calculated on the condition that the rotating electrical machine 3 is attached to the ring gear 13 and the rotating electrical machine 3 and the ring gear 13 integrally rotate. Actually, there is a gear ratio between the rotating electrical machine 3 and the ring gear 13, so that the calculation result changes according to the gear ratio.

When the gear ratio of each gear shift stage and a reduction ratio of the differential device (differential ratio) are determined as illustrated in FIG. 20, the total gear ratio (gear ratio of each gear shift stage×differential ratio) is as illustrated in FIG. 21. The output of the rotating electrical machine 3 at the time of upshift when the accelerator opening ACC=100% (hereinafter, referred to as "time of WOT") in the first gear shift control may be calculated in a following manner. At the time of WOT, the upshift is performed at 5,000 rpm. When the gear shift stages before and after the gear shift are set to an X-th gear shift stage and a Y-th gear shift stage, the calculation result in the first gear shift control is as illustrated in FIG. 23. Meanwhile, subscripts 1st, 2nd, 3rd, 4th, 5th, and 6th of variables represent the first gear shift stage, the second gear shift stage, the third gear shift stage, the fourth gear shift stage, the fifth gear shift stage, and the sixth gear shift stage, respectively.

An engine speed $Ne\_r$ after the gear shift is calculated by following equation (1). Herein, GX represents a gear ratio of the X-th gear shift stage and GY represents a gear ratio of the Y-th gear shift stage.

$$Ne\_r = 5000 \times GY/GX \qquad (1)$$

A rotational speed $Ng\_x$ of the rotating electrical machine 3 before the gear shift is calculated by following equation (2). This is because the rotational speed of the second shaft is the rotational speed corresponding to the gear shift stage after the gear shift. For example, in the gear shift from the first gear shift stage to the second gear shift stage, the second gear shift stage is formed in the second transmission unit 30 and the rotational speed $N_B$ of the input shaft 17 is the rotational speed $Ne\_r$ corresponding to the second gear shift stage. Meanwhile, a gear ratio (number of teeth of the sun gear 11/number of teeth of the ring gear 13) of the differential mechanism 10 is ½. In the following description, the rotational speed of the rotating electrical machine 3 is also simply referred to as "MG rotational speed" and the output torque of the rotating electrical machine 3 is also simply referred to as "MG torque".

$$Ng\_x=(5000-Ne\_r)/2 \qquad (2)$$

The MG rotational speed after the gear shift is 0 rpm as illustrated in FIG. 14. Engine torque $Te\_x$ before the engine speed is changed is at an intersection of a WOT guard line with 5,000 rpm in FIG. 26. The WOT guard line determines an upper limit guard value of the engine torque. FIG. 25 illustrates tire torque To in each of the first, second, third, fourth, and fifth gear shift stages with respect to each vehicle speed at the time of WOT. A curved line indicating the tire torque To in each gear shift stage may be calculated by multiplication of the gear ratio of each gear shift stage by the WOT guard line in FIG. 26.

For example, engine torque $Te\_{1st}$ in the first gear shift stage before the gear shift is a torque value at the intersection of the engine speed Ne=5,000 rpm with the WOT guard line as illustrated in FIG. 26 and engine torque $Te\_{2nd}$ in the second gear shift stage after the gear shift is a torque value at the intersection of the engine speed Ne=2,714 rpm with the WOT guard line. Tire torque $To\_{1st}$ in the first gear shift stage is calculated by (engine torque $Te\_{1st}$)×(gear ratio $G_{1st}$) and tire torque $To\_{2nd}$ in the second gear shift stage is calculated by (engine torque $Te\_{2nd}$)×(gear ratio $G_{2nd}$). In the upshift from the first gear shift stage to the second gear shift stage at the time of WOT, change in tire torque To occurs as indicated by an arrow in FIG. 25.

Engine torque $Te\_h$ when the engine speed is changed is the same value as engine torque $Te\_r$ after the gear shift. The engine torque $Te\_r$ after the gear shift is at the intersection of the engine speed $Ne\_r$ after the gear shift and the WOT guard line illustrated in FIG. 26.

MG torque $Tg\_h$ when the engine speed is changed is calculated by following equation (3).

$$Tg\_h=Te\_h\times 2 \qquad (3)$$

A maximum MG output $Wg\_{max}$ is calculated by following equation (4).

$$Wg\_max=Ng\_x\times Tg\_h\times 2\pi \div 60\div 1000 \qquad (4)$$

Figure 27:
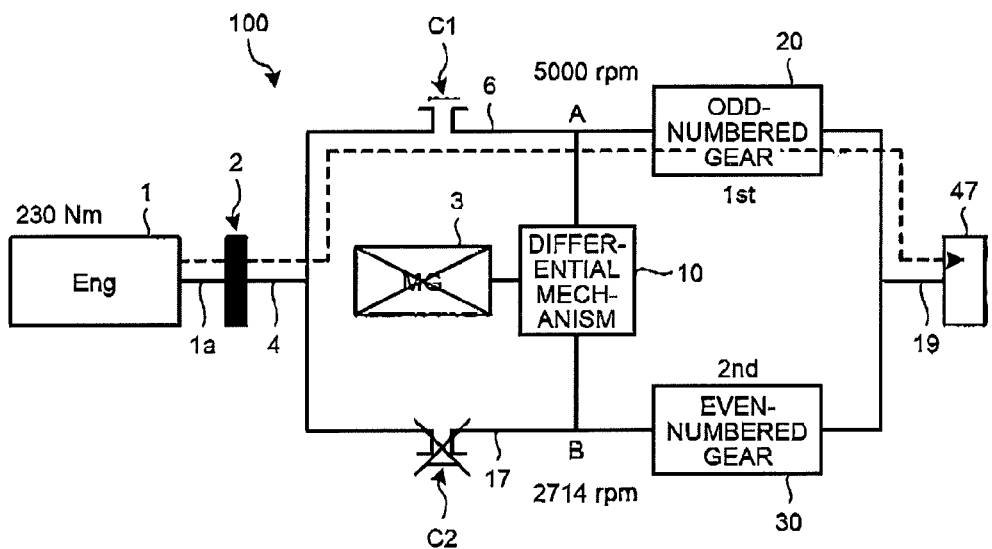
FIG. 27 is a view of an engine driving state in the first gear shift stage.
Figure 28:
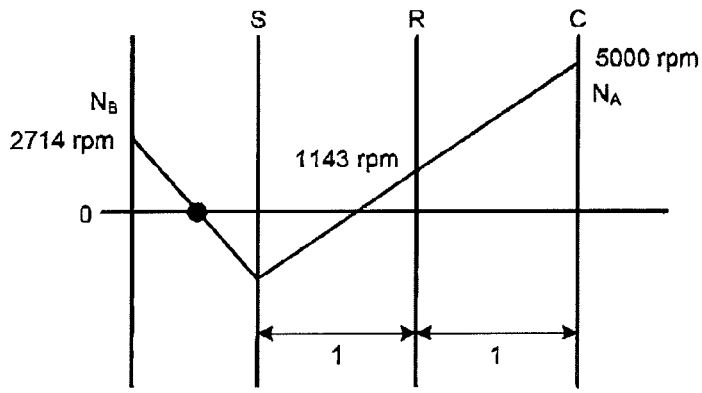
FIG. 28 is an alignment chart according to the engine driving in the first gear shift stage.

The output of the rotating electrical machine 3 in the first gear shift control is described with reference to the time chart in FIG. 24 by taking a case of the upshift from the first gear shift stage to the second gear shift stage as an example. In FIG. 24, To, No, Te, Ne, Tg, Ng, and Wg represent the tire torque, a tire rotational speed, the engine torque, the engine speed, the MG torque, the MG rotational speed, and the MG output, respectively. FIG. 27 is a view of an engine driving state in the first gear shift stage and FIG. 28 is an alignment chart according to the engine driving in the first gear shift stage. In FIG. 24, the gear shift to the second gear shift stage is determined at time t1 during the engine driving in the first gear shift stage.

In the engine driving in the first gear shift stage, as illustrated in FIG. 23, the engine torque $Te\_x$ and the engine speed before the gear shift are 230 Nm and 5,000 rpm, respectively. As illustrated in FIG. 28, the rotational speed $N_A$ of the input shaft 17 of the second transmission unit 30 is 2,714 rpm corresponding to the second gear shift stage.

Figure 29:
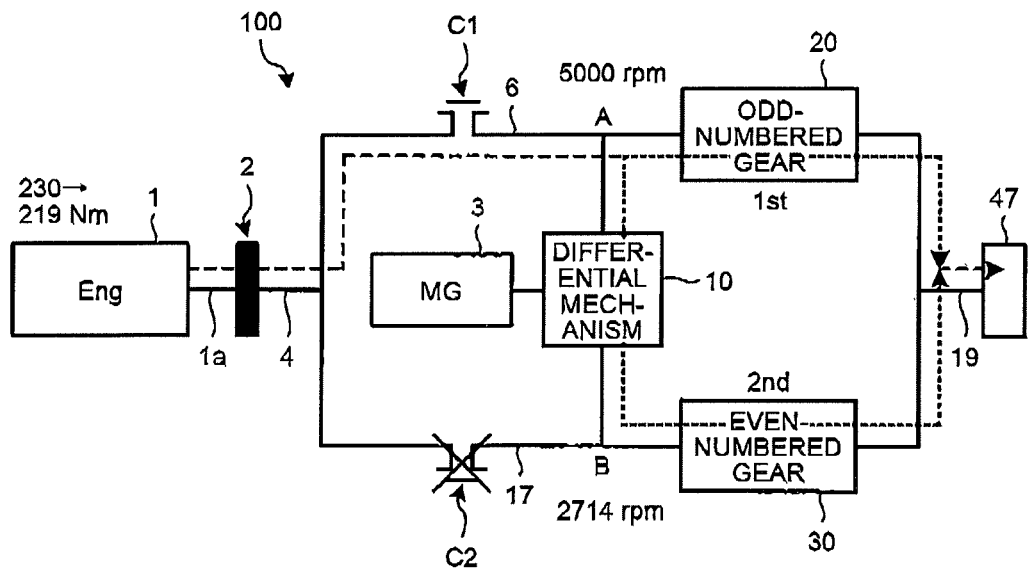
FIG. 29 is a view of a procedure at a first stage of the first gear shift control.
Figure 30:
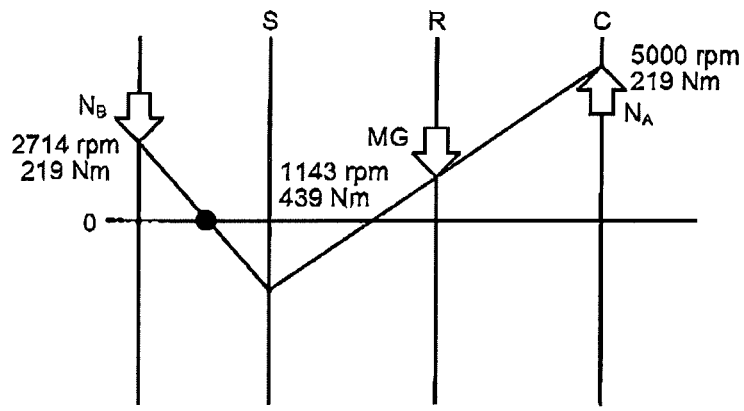
FIG. 30 is an alignment chart according to the procedure at the first stage of the first gear shift control.

When the upshift to the second gear shift stage is determined at time t1 in this state, the engine torque is changed from the engine torque $Te\_x$ before the gear shift of 230 Nm to the engine torque $Te\_r$ after the gear shift of 219 Nm. FIG. 29 is a view of a procedure at a first stage of the first gear shift control and FIG. 30 is an alignment chart according to the procedure at the first stage of the first gear shift control.

As illustrated in FIG. 29, the engine torque is changed and the rotating electrical machine 3 receives the engine reaction force. As illustrated in FIG. 24, magnitude of the MG torque Tg of the rotating electrical machine 3 which receives the engine reaction force changes from 0 Nm before the gear shift is started to the MG torque $Tg\_h$ when the engine speed is changed of 439 Nm. As illustrated in FIG. 30, the rotating electrical machine 3 receives the engine reaction force in the regenerative state in which this normally rotates and generates the negative torque.

Figure 31:
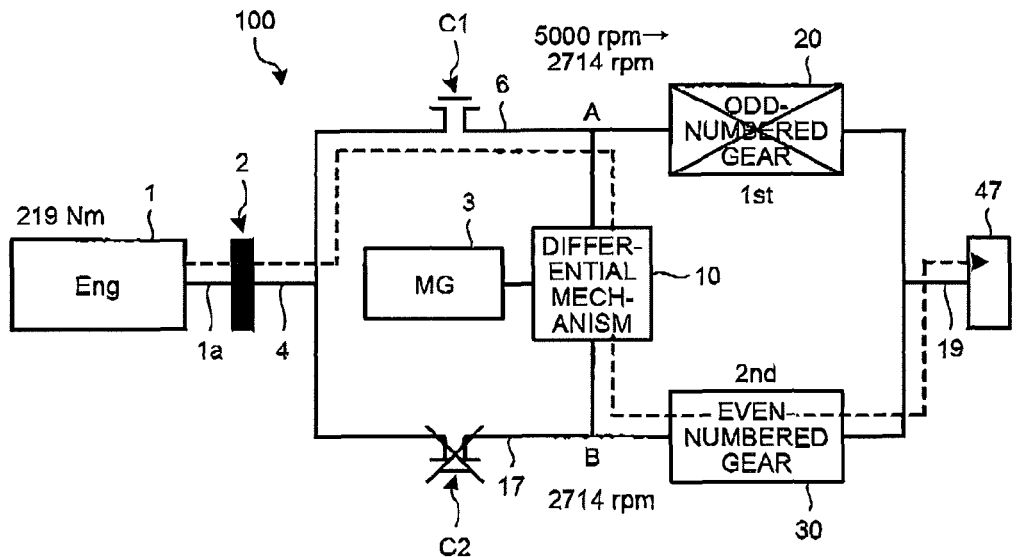
FIG. 31 is a view of a procedure at a second stage of the first gear shift control.
Figure 32:
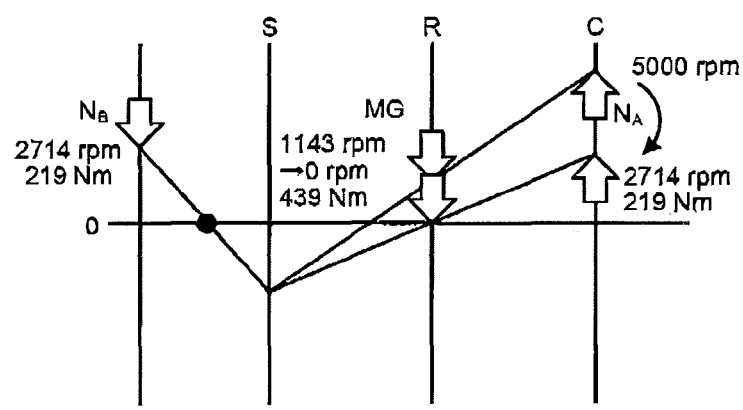
FIG. 32 is an alignment chart according to the procedure at the second stage of the first gear shift control.

FIG. 31 is a view of a procedure at a second stage of the first gear shift control and FIG. 32 is an alignment chart according to the procedure at the second stage of the first gear shift control. Following the procedure at the first stage, the ECU 50 puts the first transmission unit 20 into the neutral state, changes the engine speed, and engages the second clutch C2. Since the first transmission unit 20 is put into the neutral state, the power transmission through the first transmission unit 20 is blocked as illustrated in FIG. 31. The engine speed Ne is changed from the engine speed $Ne\_x$ before the gear shift of 5,000 rpm to the engine speed $Ne\_r$ after the gear shift of 2,714 rpm. In FIG. 24, the engine speed starts changing at time t2 and the change in engine speed is completed at time t3 and the second clutch C2 is engaged.

Figure 33:
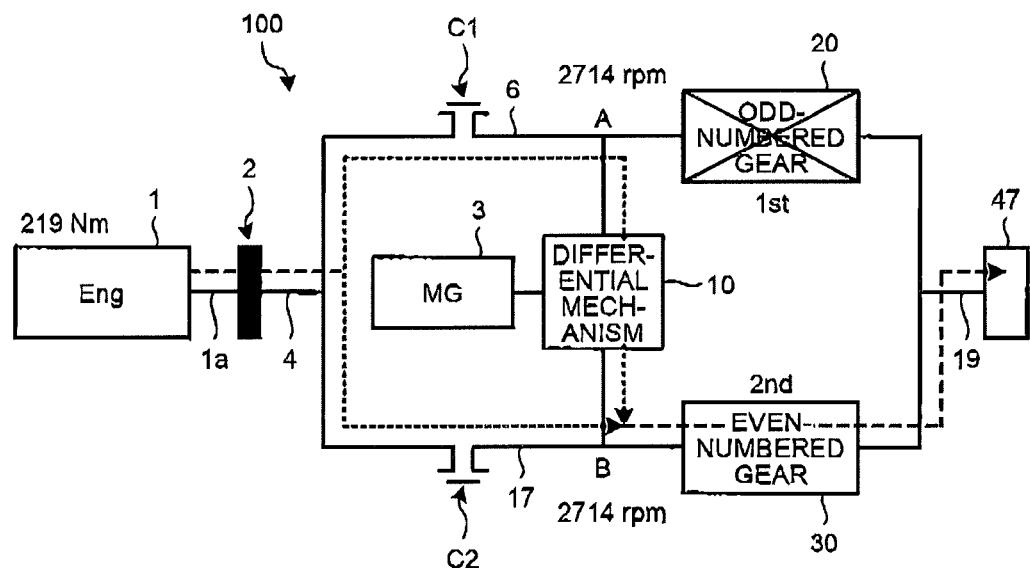
FIG. 33 is a view of a procedure at a third stage of the first gear shift control.
Figure 34:
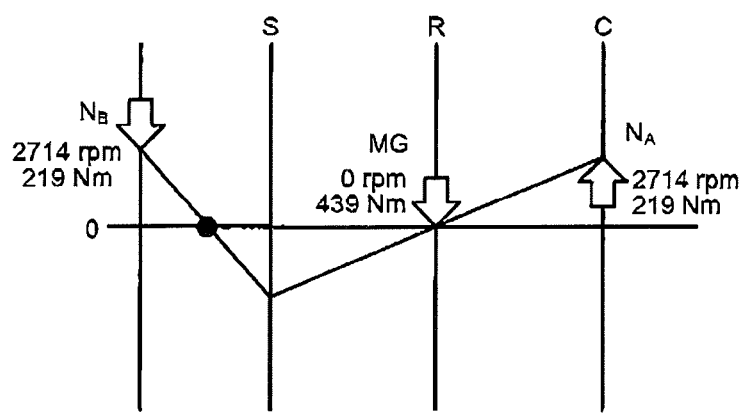
FIG. 34 is an alignment chart according to the procedure at the third stage of the first gear shift control.

FIG. 33 is a view of a procedure at a third stage of the first gear shift control and FIG. 34 is an alignment chart according to the procedure at the third stage of the first gear shift control. The second clutch C2 is engaged in the procedure at the second stage, so that the power transmission path is changed. A part of the engine torque is transmitted to the second transmission unit 30 through the second clutch C2. Following the procedure at the second stage, the ECU 50 allows the rotating electrical machine 3 to stop receiving the reaction force and further changes the power transmission path. According to this, shift to the driving in the second gear shift stage is completed. In FIG. 24, the magnitude of the MG torque Tg decreases from time t3 to time t4 and the power transmission path is switched.

Figure 35:
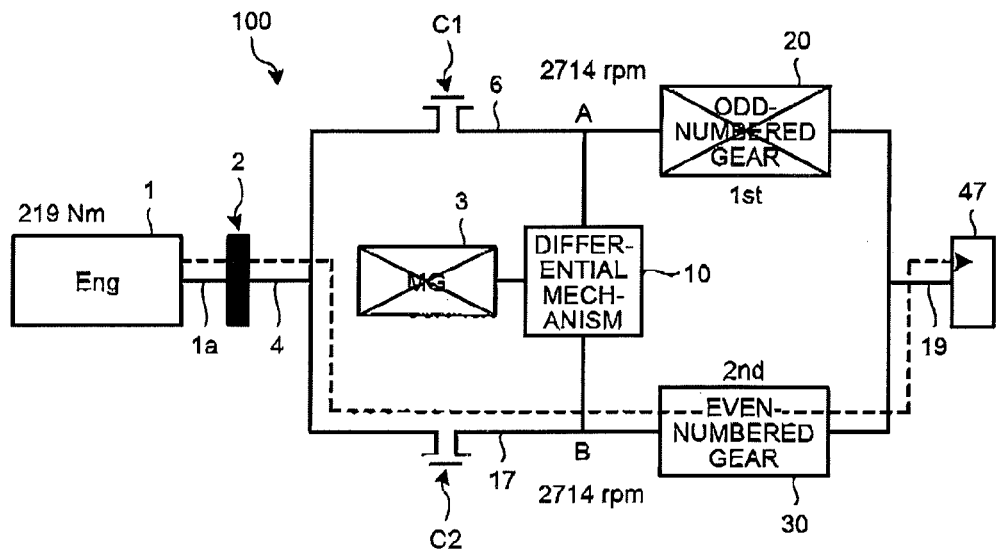
FIG. 35 is a view of an engine driving state in the second gear shift stage.
Figure 36:
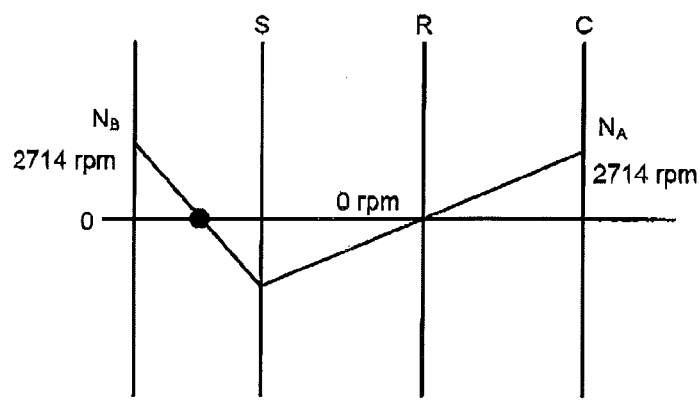
FIG. 36 is an alignment chart according to the engine driving state in the second gear shift stage.

FIG. 35 is a view of an engine driving state in the second gear shift stage and FIG. 36 is an alignment chart according to the engine driving state in the second gear shift stage. The output of the rotating electrical machine 3 is set to 0 and reaction force reception is stopped, so that the power transmission through the differential mechanism 10 is blocked. According to this, the engine torque is transmitted from the rotary shaft 4 to the driving wheel 47 through the second clutch C2 and the second transmission unit 30.

In the first gear shift control described above, the MG torque when the engine reaction force is received during the gear shift is large as 439 Nm. Meanwhile, in the time chart in FIG. 24, a case in which the engine torque $Te\_{1st}$ before the gear shift (first gear shift stage) is larger than the engine torque $Te\_{2nd}$ after the gear shift (second gear shift stage) is illustrated. When the engine torque $Te\_{1st}$ before the gear shift is smaller than the engine torque $Te\_{2nd}$ after the gear shift in contrast, it may be configured such that the engine torque Te is not changed when the transmission path is changed from time t1 to t2 and the engine torque Te is changed when the transmission path is changed from time t3 to t4.

Although inertia is not taken into consideration in the time chart in FIG. 24, the tire torque To actually increases when the engine speed is changed from time t2 to t3. Therefore, it is also possible to perform control to make the tire torque To constant by decreasing the engine torque Te.

Figure 37:
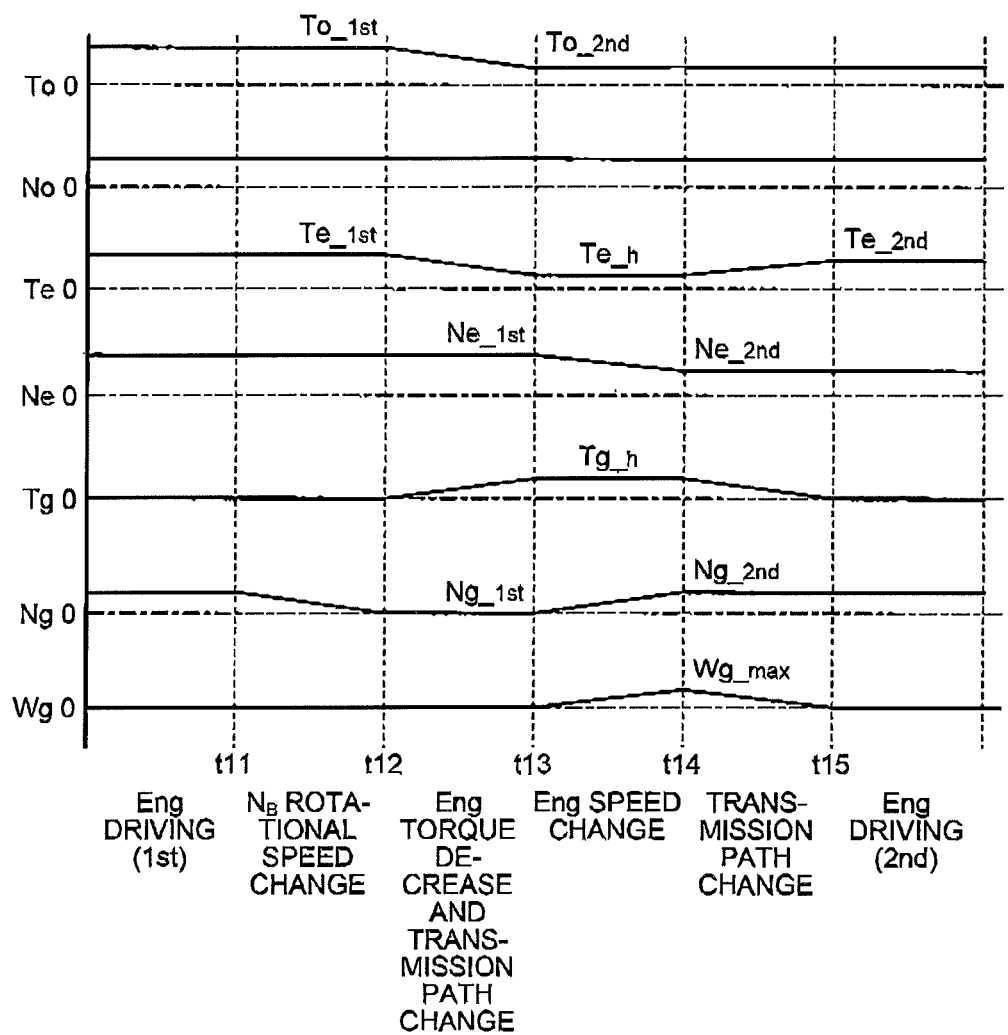
FIG. 37 is a time chart according to second gear shift control.
Figure 39:
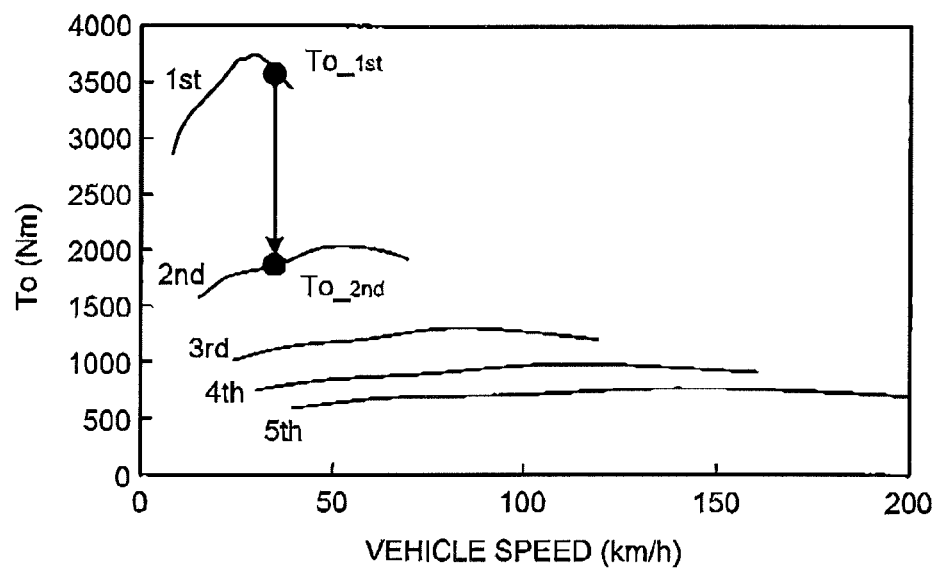
FIG. 39 is a view of change in tire torque according to the second gear shift control.
Figure 40:
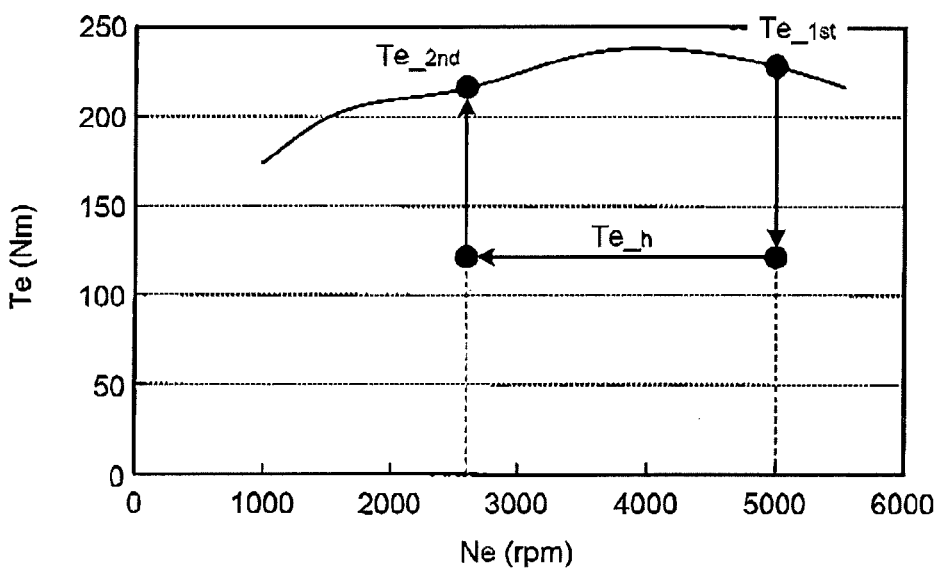
FIG. 40 is a view of transition of an engine operation point according to the second gear shift control.

Next, the output of the rotating electrical machine 3 at the time of the upshift from the first gear shift stage to the second gear shift stage in the second gear shift control is described with reference to a time chart in FIG. 37. FIG. 37 is the time chart according to the second gear shift control. FIG. 38 is a view of a calculation result according to the second gear shift control, FIG. 39 is a view of change in tire torque according to the second gear shift control, and FIG. 40 is a view of transition of the engine operation point according to the second gear shift control.

Figure 41:
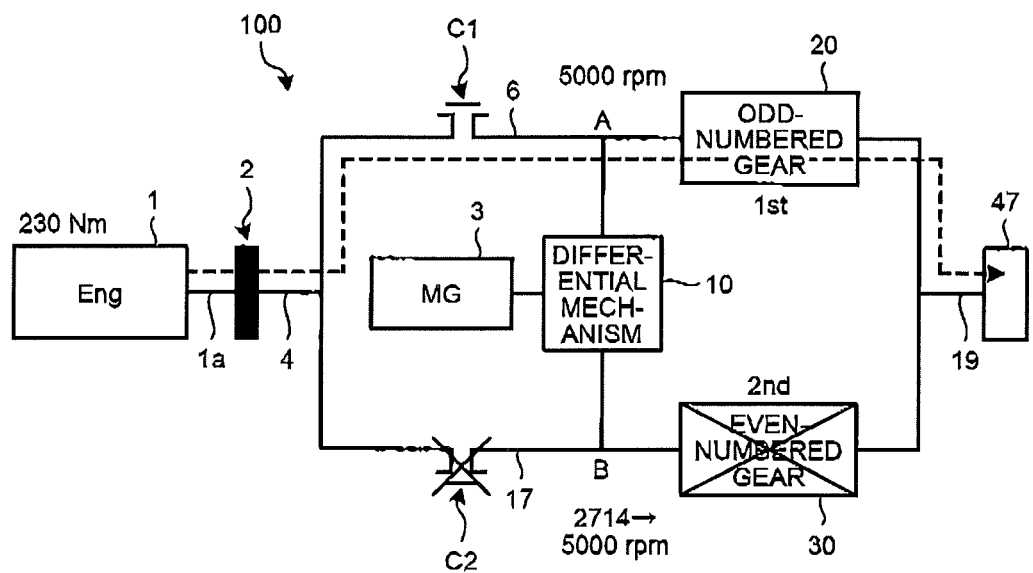
FIG. 41 is a view of a procedure at a first stage of the second gear shift control.
Figure 42:
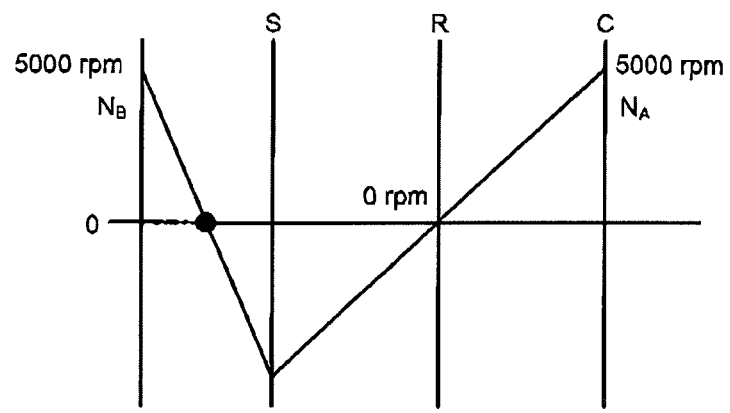
FIG. 42 is an alignment chart according to the procedure at the first stage of the second gear shift control.

FIG. 41 is a view of a procedure at a first stage of the second gear shift control and FIG. 42 is an alignment chart according to the procedure at the first stage of the second gear shift control. When the gear shift is determined at time t11 during the driving in the first gear shift stage (FIGS. 27 and 28), the ECU 50 puts the second transmission unit 30 into the neutral state, makes the rotational speed $N_B$ of the input shaft 17 the same as the rotational speed $N_A$ of the input shaft 6, and engages the second clutch C2. The ECU 50 puts the second transmission unit 30 into the neutral state to block the power transmission between the driving wheel 47 and the input shaft 17 and increases the rotational speed $N_B$ of the input shaft 17 to 5,000 rpm, the rotational speed $N_A$ of the input shaft 6 by the rotational speed control of the rotating electrical machine 3. When the rotational speed control is completed, the ECU 50 engages the second clutch C2.

Figure 43:
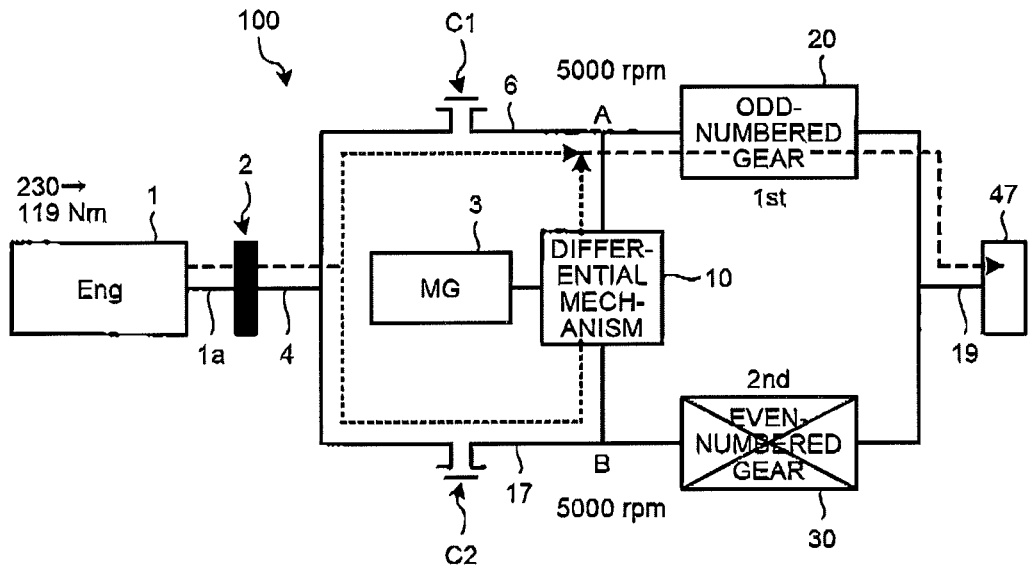
FIG. 43 is a view of a procedure at a second stage of the second gear shift control.
Figure 44:
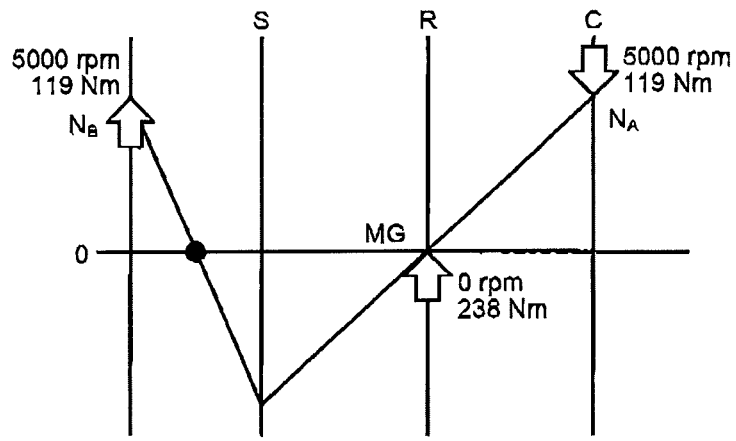
FIG. 44 is an alignment chart according to the procedure at the second stage of the second gear shift control.

FIG. 43 is a view of a procedure at a second stage of the second gear shift control and FIG. 44 is an alignment chart according to the procedure at the second stage of the second gear shift control. The ECU 50 decreases the engine torque Te and changes the power transmission path at the second stage. The engine torque Te decreases from the engine torque Te_$x$ before the gear shift of 230 Nm to the engine torque Te_$h$ when the engine speed is changed of 119 Nm illustrated in FIG. 38. On the other hand, the magnitude of the MG torque Tg of the rotating electrical machine 3 which receives the engine reaction force increases from 0 Nm before the gear shift is started to the MG torque Tg_$h$ when the engine speed is changed of 236 Nm. In the time chart in FIG. 37, the engine torque Te decreases and the MG torque Tg increases from time t12 to time t13.

The second clutch C2 is engaged in the procedure at the first stage and the rotating electrical machine 3 receives the engine reaction force at the second stage, so that a part of the engine torque is transmitted from the rotary shaft 4 to the input shaft 6 through the second clutch C2 and the differential mechanism 10 as illustrated in FIG. 43.

Figure 45:
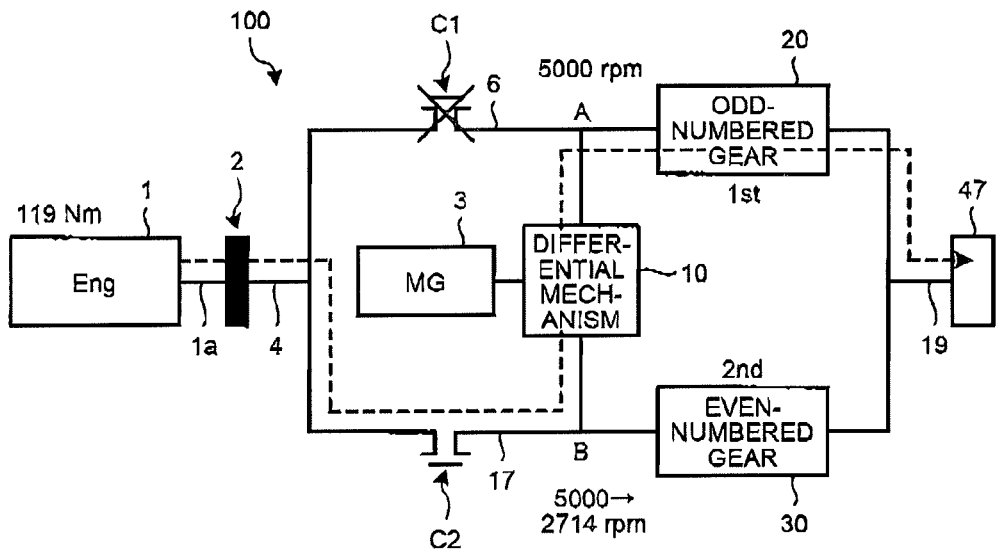
FIG. 45 is a view of a procedure at a third stage of the second gear shift control.
Figure 46:
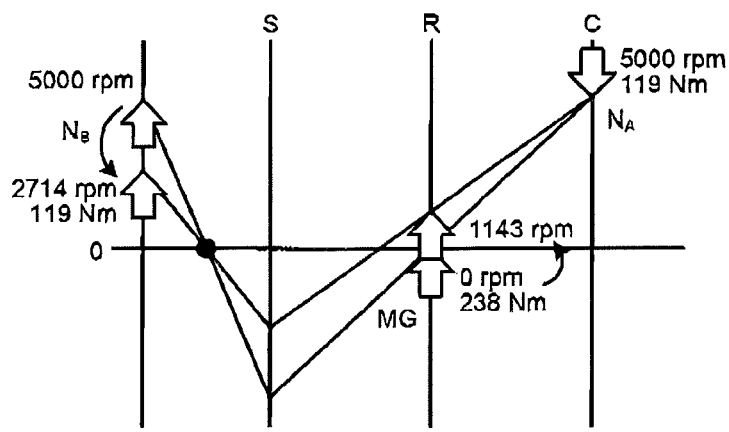
FIG. 46 is an alignment chart according to the procedure at the third stage of the second gear shift control.

FIG. 45 is a view of a procedure at a third stage of the second gear shift control and FIG. 46 is an alignment chart according to the procedure at the third stage of the second gear shift control. The ECU 50 disengages the first clutch C1, changes the engine speed Ne, and shifts the second transmission unit 30 to the second gear shift stage at the third stage. Since the first clutch C1 is disengaged, the power transmission between the rotary shaft 4 and the input shaft 6 through the first clutch C1 is blocked. The ECU 50 decreases the engine speed Ne from the engine speed Ne_$x$ before the gear shift of 5,000 rpm to the engine speed Ne_$y$ after the gear shift of 2,714 rpm. In the time chart in FIG. 37, the engine speed Ne decreases from time t13 to time t14 and the gear pair of the second gear shift stage is engaged at time t14.

Figure 47:
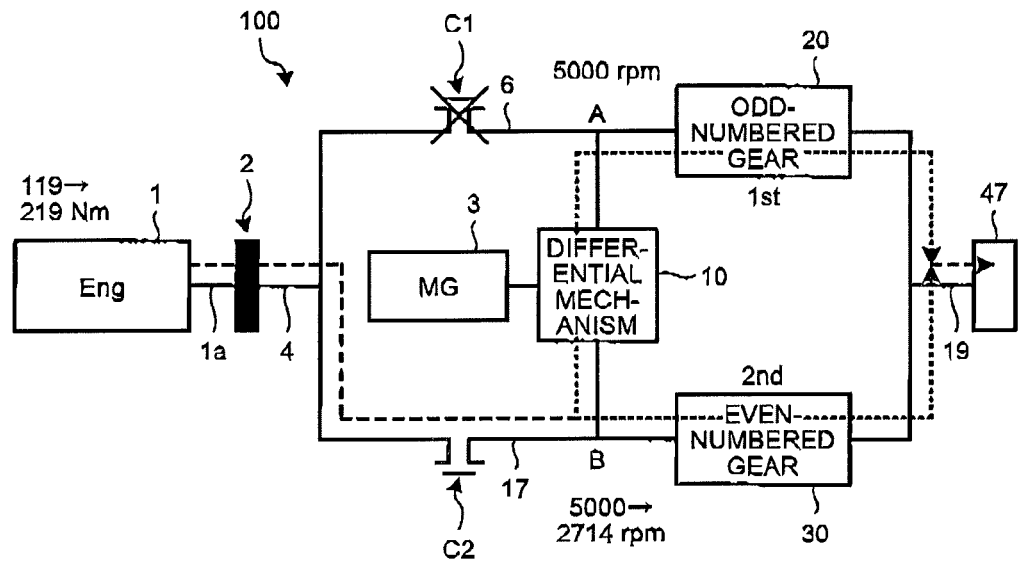
FIG. 47 is a view of a procedure at a fourth stage of the second gear shift control.
Figure 48:
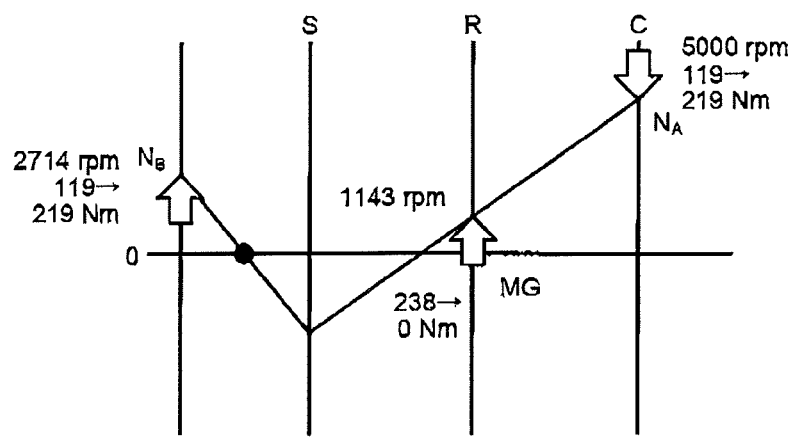
FIG. 48 is an alignment chart according to the procedure at the fourth stage of the second gear shift control.

FIG. 47 is a view of a procedure at a fourth stage of the second gear shift control and FIG. 48 is an alignment chart according to the procedure at the fourth stage of the second gear shift control. The ECU 50 allows the rotating electrical machine 3 to stop receiving the engine reaction force and changes the power transmission path at the fourth stage. The ECU 50 increases the engine torque Te from the engine torque Te_$h$ when the engine speed is changed of 119 Nm to the engine torque Te_$y$ after the gear shift of 219 Nm and decreases the MG torque Tg from the MG torque Tg_$h$ when the engine speed is changed of 238 Nm to 0. When the change of the power transmission path is completed at time t15, the engine driving state in the second gear shift stage is realized.

Figure 49:
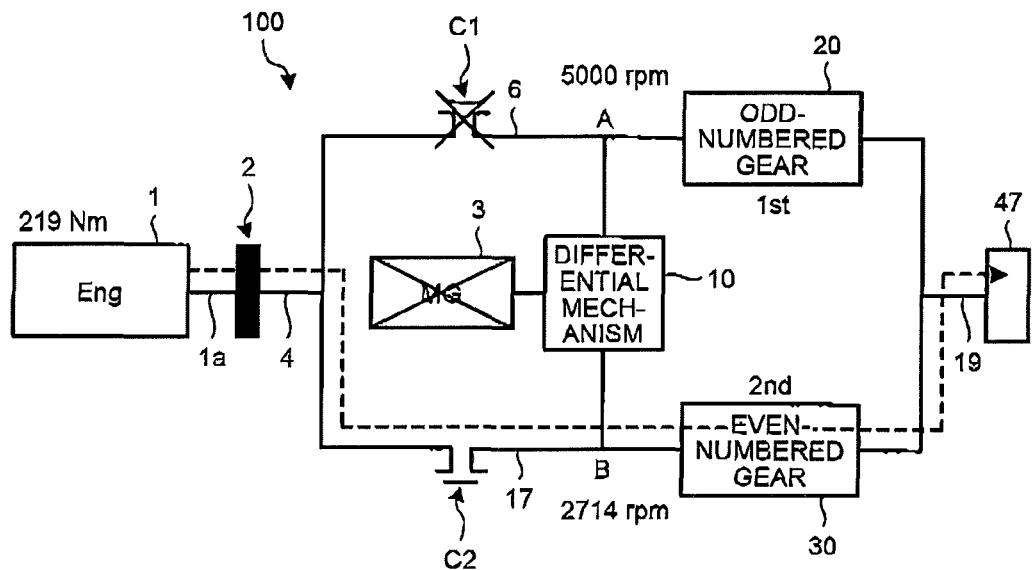
FIG. 49 is a view of the engine driving state in the second gear shift stage.
Figure 50:
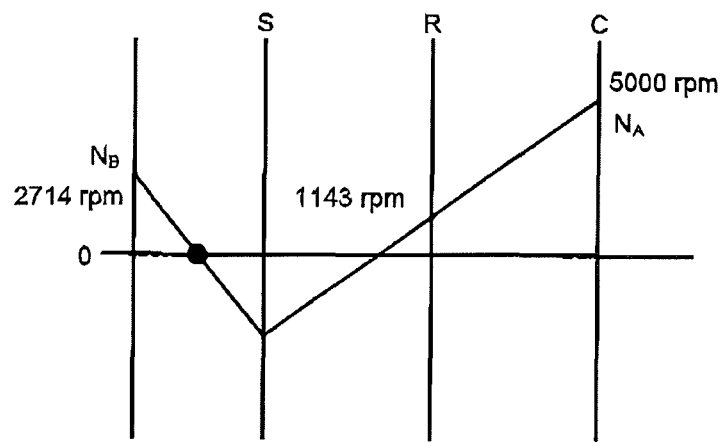
FIG. 50 is an alignment chart according to the engine driving state in the second gear shift stage.

FIG. 49 is a view of the engine driving state in the second gear shift stage and FIG. 50 is an alignment chart according to the engine driving state in the second gear shift stage. The output of the rotating electrical machine 3 is set to 0 and the reaction force reception is stopped, so that the power transmission through the differential mechanism 10 is blocked. According to this, the engine torque is transmitted from the rotary shaft 4 to the driving wheel 47 through the second clutch C2 and the second transmission unit 30.

As described above, at the time of the upshift from the first gear shift stage to the second gear shift stage, the engine torque Te and the MG torque Tg during the gear shift are 219 Nm and 439 Nm, respectively, in the first gear shift control; the engine torque Te and the MG torque Tg during the gear shift significantly decrease to 119 Nm and 238 Nm, respectively, in the second gear shift control.

The second gear shift control and the first gear shift control are different from each other in the engine torque Te_$h$ when the engine speed is changed. They are different from each other in that, for the tire torque To_$2nd$ of the second gear shift stage, the engine torque Te_$h$ when the engine speed is changed is set to Te_$2nd$ in the first gear shift control but the engine torque Te_$h$ when the engine speed is changed is set to Te_$2nd$×$G_{2nd}$/$G_{1st}$ in the second gear shift control. That is to say, they are different from each other in that although a side of the driving wheel 47 from the differential mechanism 10 is in the second gear shift stage in the first gear shift control, this is in the first gear shift stage in the second gear shift control.

The engine torque Te required for outputting the same torque at the driving wheel 47 is different by difference between the gear ratio $G_{1st}$ of the first gear shift stage and the gear ratio $G_{2nd}$ of the second gear shift stage. In the second gear shift control, connection to the driving shaft through the first gear shift stage makes the required engine torque Te and MG torque Tg smaller than those in the first gear shift control accordingly. From an energetic viewpoint, it may be described that the difference occurs because the rotating electrical machine 3 performs the regeneration in the first gear shift control and the rotating electrical machine 3 performs the power running in the second gear shift control.

The engine torque Te_$h$ when the engine speed is changed of the second gear shift control is $G_{2nd}$/$G_{1st}$=1/1.84 times the engine torque Te_$h$ when the engine speed is changed of the first gear shift control. The MG torque Tg is calculated by the engine torque Te_$h$×2, so that the MG torque Tg also is 1/1.84 times. The maximum MG output Wg_$max$ at the time of the upshift from the first gear shift stage to the second gear shift stage is 28.5 kW in the second gear shift control, 1/1.84 times that in the first gear shift control of 52.5 kW, so that the MG output Wg is significantly decreased.

Meanwhile, although the upshift from the first gear shift stage to the second gear shift stage is described above, the upshift from the odd-numbered gear shift stage to the even-numbered gear shift stage may be executed by the similar procedure.

The upshift from the even-numbered gear shift stage to the odd-numbered gear shift stage is realized by changing the first transmission unit 20 and the second transmission unit 30 and changing the first clutch C1 and the second clutch C2 of the upshift procedure from the odd-numbered gear shift stage to the even-numbered gear shift stage.

Variation of Embodiment

A variation of the embodiment is described. As described in the above-described embodiment, an output of a rotating electrical machine 3 at the time of gear shift changes according to a gear step ratio. In general, the gear step ratio becomes smaller from a low gear shift stage side to a high gear shift stage side. This is determined by a drivability constraint and the like, for example. As is clear from FIG. 38, an output Wg of the rotating electrical machine 3 at the time of the gear shift in the low gear shift stage is larger than the output Wg of the rotating electrical machine 3 at the time of the gear shift in the high gear shift stage.

Figure 51:
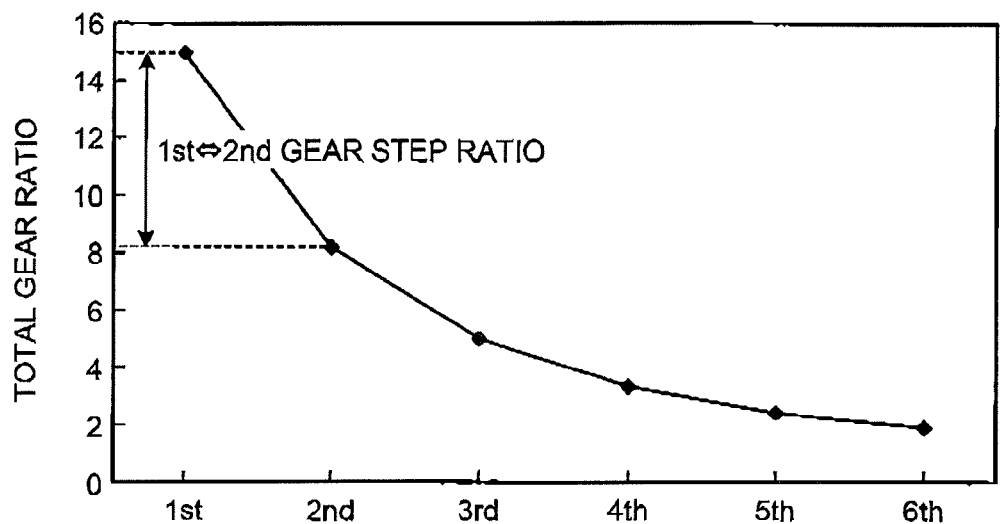
FIG. 51 is a view of an example of a gear ratio of a forward six-speed stepped transmission.
Figure 52:
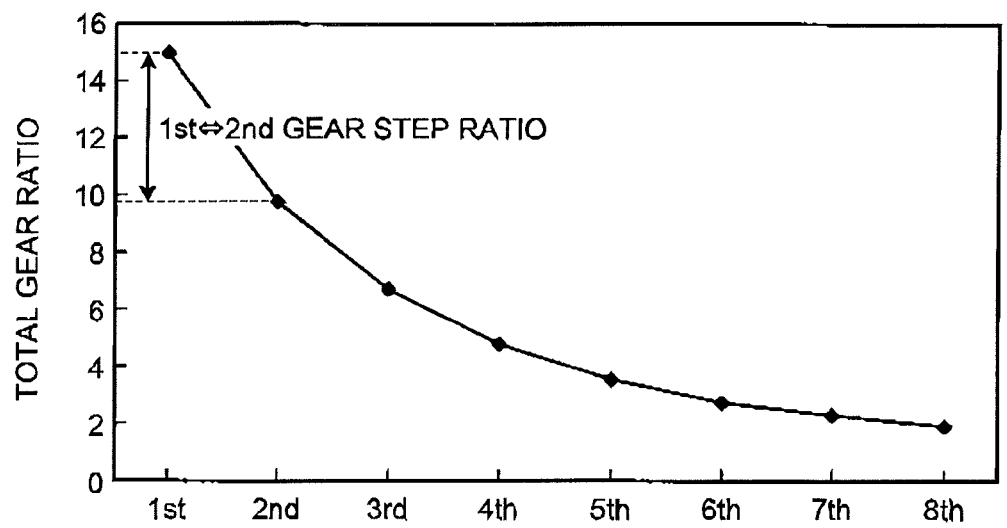
FIG. 52 is a view of an example of a gear ratio of a forward eight-speed stepped transmission.

In order to decrease the output Wg of the rotating electrical machine 3 in the low gear shift stage, there is a method of increasing the number of gear shift stages to decrease the gear step ratio between the gear shift stages. FIG. 51 is a view of an example of a gear ratio of a forward six-speed stepped transmission and FIG. 52 is a view of an example of the gear ratio of a forward eight-speed stepped transmission. The stepped transmission illustrated in FIG. 51 and the stepped transmission illustrated in FIG. 52 have the same total gear ratios in a lowest gear shift stage and a highest gear shift stage.

In each of the stepped transmissions, the gear ratio of each gear shift stage is determined so as to satisfy the constraint that the gear step ratio becomes smaller from the low gear shift stage to the high gear shift stage. In the examples illustrated in FIGS. 51 and 52, the gear step ratios between the first gear shift stage and the second gear shift stage are 1.8 and 1.55, respectively. Therefore, when the number of gear shift stages is increased from six to eight, there is an effect of decreasing the MG output Wg at the time of the gear shift to 1.55/1.8 times the same. The method has a problem that the gear step ratio of the low gear shift stages changes only a little even when the number of gear shift stages is increased, so that an effect of decreasing the MG output Wg is small with respect to the increase in the number of gear shift stages.

Figure 53:
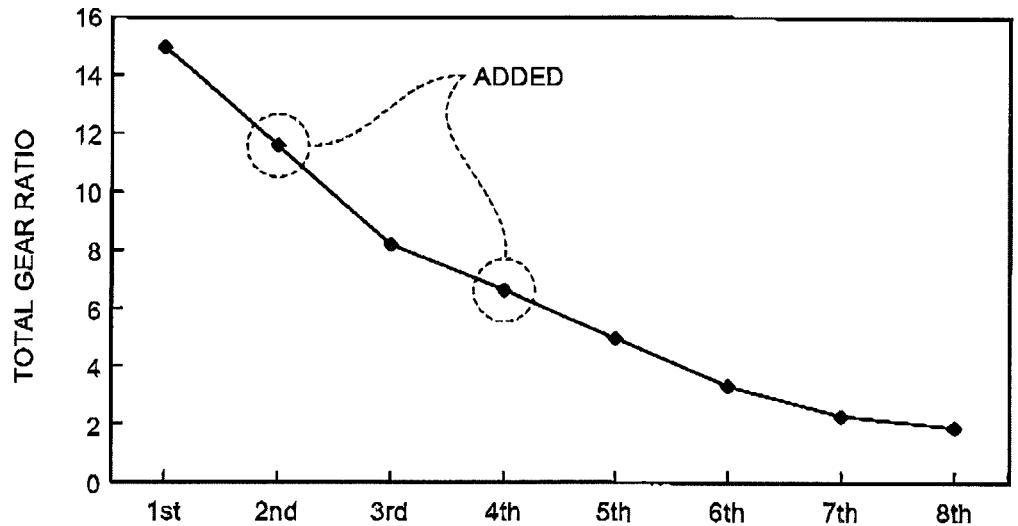
FIG. 53 is a view of an example of a total gear ratio of the eight-speed stepped transmission obtained by adding a gear shift stage of an intermediate gear ratio to the six-speed stepped transmission.

In order to maximize the effect of decreasing the MG output Wg by the increase in the number of the gear shift stages, there is a method of adding the gear shift stage having an intermediate gear ratio between the first gear shift stage and the second gear shift stage and between the second gear shift stage and the third gear shift stage having large gear step ratios, for example. FIG. 53 is a view of an example of the total gear ratio of the eight-speed stepped transmission obtained by adding the gear shift stages having the intermediate gear ratio to the six-speed stepped transmission. As illustrated in FIG. 53, the eight-speed stepped transmission is obtained by adding the gear shift stages having the intermediate gear ratios between the first gear shift stage and the second gear shift stage and between the second gear shift stage and the third gear shift stage of the six-speed stepped transmission. Although it is possible to decrease the gear step ratio in the low gear shift stages by adding the gear shift stage in this manner; however, the gear step ratio in the low gear shift stages becomes smaller than the gear step ratio in the high gear shift stages, so that there is a case in which this is not preferable in terms of drivability.

As another method of decreasing the MG output Wg at the time of the gear shift, using a gear shift stage dedicated for the gear shift at the time of the gear shift is examined. For example, in a vehicle including first and second transmission units, five gear shift stages from a first gear shift stage to a fifth gear shift stage for driving are arranged in the first transmission unit and four gear shift stages which are a 1.5-th gear shift stage, a 2.5-th gear shift stage, a 3.5-th gear shift stage, and a 4.5-th gear shift stage are arranged as intermediate gear shift stages dedicated for the gear shift in the second transmission unit. The gear ratio of the intermediate gear shift stage is an intermediate value of the gear ratios of the gear shift stages for driving next to the same. For example, the gear ratio of the 1.5-th gear shift stage is an intermediate value of a gear ratio $G_{1st}$ of the first gear shift stage and a gear ratio $G_{2nd}$ of the second gear shift stage.

The gear shift stages of the first transmission unit are shifted through the intermediate gear shift stage of the second transmission unit. For example, at the time of upshift from the first gear shift stage to the second gear shift stage in the first transmission unit, the first gear shift stage is shifted to the second gear shift stage through the 1.5-th gear shift stage. It is possible to decrease the MG output Wg by shifting through the intermediate gear shift stage in this manner. Herein, if all the gear shift stages are shifted through the intermediate gear shift stage, cost might be high. This is because it is required to set the intermediate gear shift stage for each gear shift stage for driving. For example, if the gear shift between the fourth gear shift stage and the fifth gear shift stage is performed through the 1.5-th gear shift stage, change in engine speed Ne becomes large and this increases the MG output Wg. Therefore, a five-speed first transmission unit must be provided with four intermediate gear shift stages.

Figure 54:
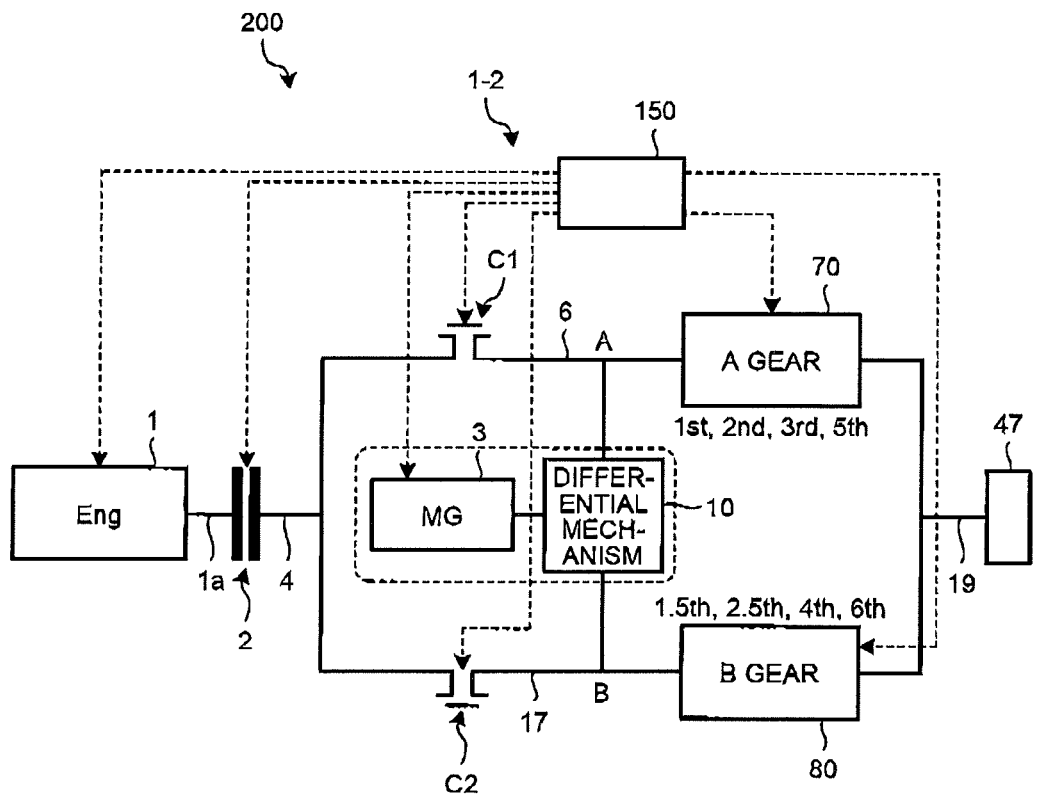
FIG. 54 is a schematic configuration diagram of a vehicle according to a variation of the embodiment.

In a driving device for vehicle 1-2 according to this variation, the intermediate gear shift stage for gear shift is provided for the gear shift stages with a large gear step ratio and the intermediate gear shift stage for gear shift is not provided for the gear shift stages with a small gear step ratio. According to this, the decrease in MG output Wg during the gear shift and the decrease in the number of gear shift stages go together. FIG. 54 is a schematic configuration diagram of a vehicle 200 according to the variation of the embodiment and FIG. 55 is a view of a total gear ratio of the driving device for vehicle 1-2 according to this variation. The vehicle 200 according to the variation is described about difference from the vehicle 100 of the embodiment.

A first transmission unit 70 of the vehicle 200 according to this variation includes a first gear shift stage, a second gear shift stage, a third gear shift stage, and a fifth gear shift stage. In this manner, the first and second gear shift stages and the second and third gear shift stages are arranged as two successive gear shift stages in the first transmission unit 70. Herein, the successive gear shift stages may be two gear shift stages selectable by a driver through shift operation adjacent to each other in the order of the transmission gear ratios, for example. Alternatively, the successive gear shift stages may also be the gear shift stages for driving adjacent to each other in the order of the transmission gear ratios.

A second transmission unit 80 of the vehicle 200 includes a 1.5-th gear shift stage, a 2.5-th gear shift stage, a fourth gear shift stage, and a sixth gear shift stage. Out of the gear shift stages of the first transmission unit 70 and the gear shift stages of the second transmission unit 80, the gear shift stages for driving are the first gear shift stage, the second gear shift stage, the third gear shift stage, the fourth gear shift stage, the fifth gear shift stage, and the sixth gear shift stage. The gear shift stages for gear shift, in other words, the intermediate gear shift stages are the 1.5-th gear shift stage and the 2.5-th gear shift stage. The 1.5-th gear shift stage is the intermediate gear shift stage corresponding to the first and second gear shift stages. The gear ratio of the 1.5-th gear shift stage is the gear ratio between the gear ratio of the first gear shift stage and the gear ratio of the second gear shift stage, for example, the intermediate gear ratio.

The 2.5-th gear shift stage is the intermediate gear shift stage corresponding to the second and third gear shift stages. The gear ratio of the 2.5-th gear shift stage is the gear ratio between the gear ratio of the second gear shift stage and the gear ratio of the third gear shift stage, for example, the intermediate gear ratio. The two successive gear shift stages and the intermediate gear shift stage corresponding to them, are arranged in different transmission units. For example, the first and second gear shift stages and the 1.5-th gear shift stage are arranged in the different transmission units. When the intermediate gear shift stage is provided between the two successive gear shift stages, the upshift between the two gear shift stages is through the corresponding intermediate gear shift stage. When an ECU 150 shifts up from the first gear shift stage to the second gear shift stage, for example, this shifts up from the first gear shift stage to the 1.5-th gear shift stage and further shifts up from the 1.5-th gear shift stage to the second gear shift stage.

The intermediate gear shift stage is provided between the first and second gear shift stages and between the second and third gear shift stages in which the gear step ratio of the two successive gear shift stages is large. The gear shift stages from the third gear shift stage to the sixth gear shift stage are alternatively arranged in the first and second transmission units 70 and 80. It is possible to determine whether to provide the intermediate gear shift stage for gear shift depending on whether a maximum MG output $Wg\_{max}$ during the gear shift is larger than a threshold of the output determined based on fuel consumption.

For example, suppose that the threshold of the MG output determined based on the fuel consumption is 25 kW for the calculation result in FIG. 38. In this case, the maximum MG output $Wg\_{max}$ is larger than the threshold 25 kW in the gear shift from the first gear shift stage to the second gear shift stage ($Wg\_{max}=28.5$ kW) and the gear shift from the second gear shift stage to the third gear shift stage ($Wg\_{max}=27.8$ kW), so that it is determined that the intermediate gear shift stage is required. The maximum MG output $Wg\_{max}$ changes according to the gear step ratio of the gear shift stages before and after the gear shift. Therefore, the intermediate gear shift stage is provided for a group of the gear shift stages in which the gear step ratio of the two successive gear shift stages is not smaller than a predetermined value in this embodiment.

FIG. 56 is a view of a calculation result according to the gear shift using the intermediate gear shift stage. The gear shift from the gear shift stage for driving to the intermediate gear shift stage (for example, from first to 1.5-th) and the gear shift from the intermediate gear shift stage to the gear shift stage for driving (for example, from 1.5-th to second) may be performed by the above-described procedure of the second gear shift control.

As illustrated in FIG. 56, a positive MG rotational speed before the gear shift becomes a negative MG rotational speed after the gear shift. In the upshift through the intermediate gear shift stage of this variation, engine torque $Te\_h$ when the engine speed is changed decreases from that in a case in which the vehicle 100 without the intermediate gear shift stage provided executes the first gear shift control (FIG. 23). Specifically, the engine torque $Te\_h$ when the engine speed is changed at the time of the upshift through the intermediate gear shift stage in this variation is $GY/\{(GX+GY)/2\}$ times the engine torque $Te\_h$ when the engine speed is changed in a case in which the first gear shift control is executed in the above-described embodiment.

The maximum MG output $Wg\_{max}$ decreases. The maximum MG output $Wg\_{max}$ at the time of the upshift through the intermediate gear shift stage in this variation significantly decreases from the maximum MG output $Wg\_{max}$ when the second gear shift control is performed without the intermediate gear shift stage (FIG. 38). Therefore, according to the driving device for vehicle 1-2 according to this variation, an effect of decreasing the MG output Wg with respect to the addition of the gear shift stage is large and it is possible to minimize the number of gear shift stages to be added. Since a rotational speed variation of the transmission gear ratio becomes smaller, it is possible to shorten time for the gear shift.

Meanwhile, the intermediate gear shift stage is the gear shift stage for gear shift and is different from the gear shift stage for driving; however, the driving of the vehicle 200 in the intermediate gear shift stage may be allowed when a condition such as no problem in drivability is satisfied. For example, when the fuel consumption may be improved by the driving in the intermediate gear shift stage and when there is no problem in drivability, the driving in the intermediate gear shift stage may be allowed.

The contents disclosed in the above-described embodiment and variation may be appropriately combined to be executed.

REFERENCE SIGNS LIST 1-1,1-2 DRIVING DEVICE FOR VEHICLE
1 ENGINE
3 ROTATING ELECTRICAL MACHINE
10 DIFFERENTIAL MECHANISM
20 FIRST TRANSMISSION UNIT
30 SECOND TRANSMISSION UNIT
47 DRIVING WHEEL
50 ECU
100 VEHICLE
C1 FIRST CLUTCH
C2 SECOND CLUTCH

The invention claimed is:

1. A driving device for vehicle comprising:
a first shaft configured to connect an engine to a driving shaft and capable of connecting/disconnecting to/from the engine;
a second shaft configured to connect the engine to the driving shaft and capable of connecting/disconnecting to/from the engine; and
a differential mechanism configured to connect the first shaft, the second shaft, and a rotating electrical machine to one another, wherein
at the time of upshift to a gear shift stage of the second shaft from a state in which the first shaft is connected to the engine and the engine is connected to the driving shaft through a gear shift stage of the first shaft,
power transmission to the driving shaft through the second shaft is blocked,
the second shaft is connected to the engine,
power of the engine is transmitted to the second shaft by output control of the rotating electrical machine,
the first shaft is disconnected from the engine, and
the engine is connected to the driving shaft through the gear shift stage of the second shaft.

2. The driving device for vehicle according to claim 1, further comprising:
two successive gear shift stages arranged on any one of the first and second shafts and an intermediate gear shift stage arranged on the other shaft, wherein a transmission gear ratio of the intermediate gear shift stage is the transmission gear ratio between transmission gear ratios of the two successive gear shift stages, and the upshift between the two successive gear shift stages is through the intermediate gear shift stage.

3. The driving device for vehicle according to claim 2, wherein the intermediate gear shift stage is provided for a group of gear shift stages in which a gear step ratio of the two successive gear shift stages is not smaller than a predetermined value.

4. The driving device for vehicle according to claim 1, wherein at the time the upshift from the gear shift stage of the first shaft to the gear shift stage of the second shaft is predicted, the power transmission to the driving shaft through the second shaft is blocked in advance.

5. The driving device for vehicle according to claim 1, wherein the rotating electrical machine performs power running at the time of the upshift from the gear shift stage of the first shaft to the gear shift stage of the second shaft.

* * * * *